(12) United States Patent
Kato

(10) Patent No.: US 6,190,571 B1
(45) Date of Patent: Feb. 20, 2001

(54) SEMICONDUCTOR MICROMACHINE AND MANUFACTURING METHOD THEREOF

(75) Inventor: Manabu Kato, Nagoya (JP)

(73) Assignee: Aisin Seiki Kabushiki Kaisha, Kariya (JP)

( * ) Notice: Under 35 U.S.C. 154(b), the term of this patent shall be extended for 0 days.

(21) Appl. No.: 08/994,759

(22) Filed: Dec. 19, 1997

(30) Foreign Application Priority Data

Dec. 20, 1996 (JP) .................................................. 8-355339
Jan. 20, 1997 (JP) .................................................. 9-022037
Jan. 31, 1997 (JP) .................................................. 9-032963

(51) Int. Cl.⁷ ..................................................... B81C 1/00
(52) U.S. Cl. ............................ 216/2; 438/510; 73/504.14
(58) Field of Search ......................... 73/504.02, 504.14; 216/2, 13, 95, 96, 97, 99; 438/510

(56) References Cited

U.S. PATENT DOCUMENTS 5,600,065 * 2/1997 Kar et al. ........................... 73/504.12
5,668,033 * 9/1997 Ohara et al. ........................... 438/113
5,734,105 * 3/1998 Mizukoshi ........................... 73/504.02

OTHER PUBLICATIONS

K. Y. Park et al., "Laterally Oscillated and Force–Balanced Micro Vibratory Rate Dyroscope Supported by Fish Hook Shape Springs", IEEE, Jan. 1997, pp. 494–499.
Clark et al., "Surface Micromachined Z–Axis Vibratory Rate Gyroscope", IEEE, 1996.

* cited by examiner

Primary Examiner—Randy Gulakowski
Assistant Examiner—Allan Olsen
(74) Attorney, Agent, or Firm—Oblon, Spivak, McClelland, Maier & Neustadt, P.C.

(57) ABSTRACT

A semiconductor micromachine and method of making the micromachine, wherein the micromachine includes a substrate and a movable portion made of a semiconductor thin film. The movable portion is arranged opposite the substrate with a gap interposed therebetween, and is supported by acicular bodies. This movable portion is provided with electrode sections, wires and an electrical insulation section interconnecting the electrode sections and the wires. The electrical insulation section prevents crosstalk of signals among the electrode sections and the wires to achieve a high S/N ratio as well as a high degree of design freedom. In order to achieve this purpose, the semiconductor micromachine of the present invention includes.

18 Claims, 20 Drawing Sheets

(a)

(b)

(c)

(a)

(b)

(c)

(a)

(b)

(c)

(a)

(b)

(c)

(a)

(b)

(c)

(a)

(b)

(c)

(a)

(b)

US 6,190,571 B1

SEMICONDUCTOR MICROMACHINE AND MANUFACTURING METHOD THEREOF

INCORPORATION BY REFERENCE

The entire disclosure of each of Japanese Patent Applications No. HEI 08-355339 filed on Dec. 20, 1996, HEI 09-022037 filed on Jan. 20, 1997, and HEI 09-032963 filed on Jan. 31, 1997 including specification, drawings and abstract is incorporated herein by reference in its entirety.

BACKGROUND OF THE INVENTION

1. Field of the Invention

The present invention relates to a semiconductor micromachine applied to various microsensors and a manufacturing method thereof.

2. Description of the Related Art

Conventionally, there has been developed a micromachining technology that employs semiconductor materials such as silicon. This micromachining technology enables the manufacture of a minute sensor such as an angular velocity sensor (gyro sensor), an acceleration sensor, a microactuator and the like. In combination with a generally employed technology for manufacturing semiconductor circuits or the like, this technology enables the manufacture of the aforementioned minute sensors having a dimension of less than 1 mm, without making use of machining work.

As an example of a product of this technology, a semiconductor micromachine that operates as an angular velocity sensor will now be described with reference to FIGS. 15 through 17.

A semiconductor micromachine 9 as illustrated in FIGS. 15 through 17 has a substrate 92, a movable portion 93 and a pair of stationary portions 97. The movable portion 93 is supported by acicular bodies 95, and is arranged opposite the substrate 92 with a gap 91 provided therebetween. The movable portion 93 is arranged between the stationary portions 97 that are located opposite each other. As shown in FIG. 16, the movable portion 93 is arranged parallel to the substrate 92.

The movable portion 93 is composed of a vibrating plate 96 and movable-side comb-shaped electrodes 961 integrally provided on both sides of the vibrating plate 96.

Each acicular body 95 is connected at an end thereof with a supporting portion 94 secured to the substrate 92. The supporting portions 94 are secured to the substrate 92 through securing layers 949. Each supporting portion 94 is provided with an electrode pad 948.

Furthermore, the substrate 92 has thereon a distance detecting electrode 98, which is located opposite the vibrating plate 96 to detect the distance between the substrate 92 and the vibrating plate 96. As shown in FIG. 16, the vibrating body 96 has on a back surface 962 thereof a detecting electrode section that cooperates with the distance detecting electrode 98.

The distance detecting electrode 98 is connected with an electrode pad 988 through a lead portion 980 and a terminal portion 982.

The stationary portions 97 are provided with stationary-side comb-shaped electrodes 971 for causing the vibrating plate 96 to vibrate. The stationary-side comb-shaped electrodes 971 and the movable-side comb-shaped electrodes 961 are arranged to be engaged with each other. A very narrow gap is formed between each movable-side electrode 961 and each stationary-side electrode 971.

The stationary portions 97 are secured to the substrate 92 by securing layers 979. The stationary portions 97 are provided with electrode pads 978 for applying a voltage to the stationary-side comb-shaped electrodes 971.

In the aforementioned semiconductor micromachine 9, the substrate 92 is made of monocrystal silicon, and the movable portion 93 is made of polycrystalline silicon doped with phosphorus, boron, antimony or the like. The stationary portions 97, the supporting portions 94, and the acicular bodies are also made of polycrystalline silicon doped with phosphorus, boron, antimony or the like.

The distance detecting electrode 98 provided on the substrate 92 is doped with a dopant whose characteristics are different from those of the substrate 92. More specifically, a corresponding portion of the substrate 92 made of p-type monocrystal silicon is doped with phosphorus, boron, antimony or the like, so that the distance detecting electrode 98 is obtained.

The lead portion 980 and the terminal portion 982 are also formed on the substrate 92 substantially in the same manner as the distance detecting electrode 98.

The securing layers 949, 979 are made of a silicon nitridation film.

Furthermore, the electrode pads 948, 978 and 988 are made of conductive materials such as gold, aluminium or the like.

It will be described hereinafter how the aforementioned semiconductor micromachine 9 detects an angular velocity.

First, an alternating-current voltage of a rectangular waveform ranging from 0 to $V_0$ (V) is applied between the movable-side and stationary-side comb-shaped electrodes 961, 971 on one side. This alternating-current voltage has a resonance frequency for the case where the movable portion 93 resonates in a direction indicated by arrow α of FIG. 15. An alternating-current voltage having a phase shifted by 180 degrees is applied between the movable-side and stationary-side comb-shaped electrodes 961, 971 on the other side.

There is thus generated an electrostatic force between the respective movable-side and stationary-side electrodes 961, 971. As indicated by arrow α of FIG. 15, this electrostatic force causes the vibrating plate 96 to vibrate horizontally, that is, in a direction parallel to the substrate 92.

Starting from this state, the semiconductor micromachine 9 is caused to rotate about the c-axis as illustrated in FIG. 15 at an angular velocity ω.

Then, Corioli's forces F1, F2 as illustrated in FIG. 16 are alternately applied to the vibrating plate 96, which is caused to vibrate in a direction perpendicular to the substrate 92 as indicated by arrow β of FIG. 15.

The Corioli's forces F1, F2 are represented as follows:

$$F1 = F2 = 2m\omega \times A(2\pi f)\cos\{(2\pi f)t\}$$

wherein "m" represents mass of the vibrating plate 96, "ω" angular velocity of the semiconductor micromachine 9, "A" amplitude of the vibrating plate 96, "f" frequency of the alternating-current voltage, and "t" elapsed time.

When the vibrating body 96 vibrates vertically, the distance between the vibrating body 96 and the substrate 92, that is, the thickness of the gap 91 changes in accordance with a frequency of the vibration. The change in the distance is detected as a change in the electrostatic capacity between the back surface 962 of the vibrating body 96 and the distance detecting electrode 98. Based on the value thus detected, the angular velocity ω is detected by processing signals from a circuit not shown in the drawings.

As will be described hereinafter, the semiconductor micromachine 9 has been conventionally manufactured using a generally employed technology for manufacturing semiconductor circuits.

As shown in FIGS. 18–22, a distance electrode 98 or the like is formed in a substrate 92 by doping the substrate 92 with a dopant. This dopant has a conductivity different from that of the substrate 92.

As shown in FIGS. 18a and 20a, a silicon oxidation film 653 is provided on the substrate 92, an etching stopper layer 654 is then provided on the silicon oxidation film 653, and finally an etching layer 655 is provided on the etching stopper layer 654.

After that, a resist pattern used as a mask is subsequently formed on the etching layer 655 by a photolithographic process. The etching layer 655, the etching stopper layer 654 and the silicon oxidation film 653 are subjected to a RIE (reactive ion etching) process. This etching process allows the formation of contact holes 900 penetrating the silicon oxidation film 653, the etching stopper layer 654 and the etching layer 655 as shown in FIG. 20b (Note that the contact holes 900 can not be seen from a direction shown in FIG. 18b.).

After the resist pattern has been removed, a semiconductor thin film 657 is provided on the etching layer 655 as shown in FIGS. 18c and 20c. By means of ion implantation, the entire surface of the semiconductor thin film 657 is doped with a dopant that has a conductivity equal to that of the distance detecting electrode 98 or the like formed on the substrate 92. The semiconductor thin film 657 is then subjected to a thermal treatment in order to reduce inner stress building up therein and activate the dopant contained therein.

Thereafter, a resist pattern as a mask is formed on the semiconductor thin film 657 by a photolithographic process. The semiconductor thin film 657 is then transformed by an etching process into a movable portion, the acicular bodies and a stationary portion.

A portion of the etching layer 655 located substantially beneath the movable portion and the acicular bodies is removed by an etching process. In the aforementioned etching process, the etchant passes through the introduction holes 679 having a square cross section whose side length is about 4 μm as shown in FIGS. 19a and 21a, reaches the etching layer 655 beneath the semiconductor thin film 657, and erodes the etching layer 655. By the etching process, a gap portion 611 is formed as shown in FIGS. 19b and 21b. In this state, the semiconductor thin film 657 constitutes the movable portion 93, the stationary portion 97 and the acicular bodies.

The movable portion, the stationary portions and the distance detecting electrode 618 are then suitably provided with electrode pads, so that the semiconductor micromachine 9 is completed.

However, the aforementioned semiconductor micromachine 9 has the following drawbacks.

That is, the movable-side comb-shaped electrodes 961 and the vibrating body 96 both belong to the movable portion 93 that is made of a sheet of doped polycrystalline silicon.

Hence, the movable-side comb-shaped electrodes 961 and the vibrating body 96 are electrically in communication with each other.

The movable-side comb-shaped electrodes 961 are spaced apart from the stationary-side electrodes 971 by a very narrow gap. Therefore, when a voltage is applied to the stationary-side comb-shaped electrodes 971, the movable-side comb-shaped electrodes 961 become electrified.

The modulus of elasticity of the acicular bodies 95 connected with the vibrating body 96 needs to be small in order to cause the very light vibrating body 96 to vibrate efficiently. Hence, the acicular bodies 95 generally have a small diameter and a great longitudinal dimension. The acicular bodies 95 thus have an enormous electric resistance value.

Hence, the electric charges accumulated in the movable-side comb-shaped electrodes 961 are unlikely to move towards the acicular bodies 95 whose electric resistance is great. Instead, the electric charges are accumulated in the vibrating plate 96.

Consequently, the back surface 962 of the vibrating body 96 is charged with an excessive amount of electric charges, so that the detected distance between the back surface 962 and the distance detecting electrode 98 is not exactly proportionate to the distance between the vibrating body 96 and the substrate 92.

That is, the angular velocity ω cannot be detected precisely.

In other words, in the conventional semiconductor micromachine, electric charges are likely to move between the electrodes and wires, which causes crosstalk of signals.

As described hitherto, the circuit constituting the electrodes and the wires of the semiconductor micromachine has a low S/N ratio, so that the detecting precision thereof deteriorates. Furthermore, since a plurality of electrodes within the movable portion are electrically in communication with each other, the circuit should be designed such that these electrodes are provided with an equal electric potential (these electrodes are grounded). Accordingly, the circuit has a low degree of design freedom.

In the case where the micromachining technology is applied to the acceleration sensor, the microactuator or the like, the same drawbacks as in the angular velocity sensor will be observed.

SUMMARY OF THE INVENTION

Accordingly, an object of the present invention is to eliminate the aforementioned drawbacks, and provide a new and improved semiconductor micromachine and a manufacturing method thereof that prevent crosstalk of signals between the electrodes and achieve a high S/N ratio as well as a high degree of design freedom.

According to one aspect of the present invention, there is provided a semiconductor micromachine including: a substrate; a movable portion arranged opposite the substrate with a gap interposed therebetween, the movable portion being made of a semiconductor layer and having a plurality of electrode sections and an electrical insulation section interconnecting the electrode sections; and supporting bodies for floatably supporting the movable portion.

In the semiconductor micromachine of the present invention, since the respective electrode sections and/or wires are interconnected by the electrical insulation section, it is thus possible to prevent electric charges flowing through a certain electrode section or wire from moving into another electrode section or wire through the movable portion. That is, the occurrence of crosstalk of signals among the respective electrode sections and wires can be prevented. Due to an unlikely possibility of crosstalk of signals, it is possible to enhance S/N ratios of the electrode sections and wires.

In addition, it is possible to control a current flowing through a certain electrode section or a certain wire independently of the current flowing through other electrode sections or wires. Similarly, it is possible to control a voltage applied to a certain electrode section or a certain wire independently of the voltage applied to other electrode sections or wires. Accordingly, the degree of design freedom for a circuit in the semiconductor micromachine can be enhanced.

The semiconductor micromachine of the present invention is a sensor employing micromachining technology such as an angular velocity sensor, an acceleration sensor, a microactuator or the like, including a substrate made of monocrystal silicon, polycrystal silicon, glass, monocrystal sapphire, stainless steel or the like.

Since the monocrystal silicon substrate is easily available, the productivity of the semiconductor micromachine can be enhanced. Furthermore, a generally employed process of manufacturing LSI can be directly applied to the manufacture of the semiconductor micromachine.

The polycrystal silicon substrate is available at a moderate price. Hence, it is possible to reduce the manufacturing cost of the semiconductor micromachine.

Furthermore, the glass substrate is inexpensive and easily available. Hence, it is possible to reduce the manufacturing cost or the like of the semiconductor micromachine.

According to another aspect of the present invention, there is provided a manufacturing method of a semiconductor micromachine having a substrate, a movable portion arranged opposite the substrate with a gap interposed therebetween, the movable portion being made of a semiconductor layer and having a plurality of electrode sections and an electrical insulation section interconnecting the electrode sections, and supporting bodies for floatably supporting the movable portion, including the steps of: forming an etching layer on the substrate; forming a diffusion inhibiting layer on the etching layer; forming a semiconductor layer on the diffusion inhibiting layer; selectively doping the semiconductor layer with a dopant; patterning the semiconductor layer by photolithographic etching to form holes for introducing an etchant, the plurality of electrode sections, the electrical insulation section, and the supporting bodies; and forming the gap and the semiconductor thin film as the movable portion by removing the etching layer using the etchant.

The diffusion inhibiting layer may be, for example, a silicon nitrodation film (SiN), a silicon nitrodation oxidation film (SiON) or the like, materials which decrease a rate at which various dopants contained in the etching layer are diffused. It is thus possible to inhibit the dopants from being diffused from the etching layer into the semiconductor thin film.

Hence, it is desirable to separate the conductive portions from the electrical insulation section in the step of selectively doping the semiconductor thin film with the dopant. In this manner, it is possible to prevent the electrical insulation section from being doped with the dopant contained in the etching layer, so that the reliability of the electrical insulation section is ensured.

The diffusion inhibiting layer may also be, for example, a boron glass film (BSG), which contains boron, a dopant capable of forming a p-type semiconductor. Therefore, in the case where the electrode sections and wires are made of an n-type semiconductor, the dopant in the etching layer is diffused into a portion interconnecting the electrode sections and wires. Consequently, that portion acquires, although to a limited extent, the characteristics of the p-type semiconductor.

Hence, there is formed in the movable portion a so-called npn-connection which ensures electrical insulation among the electrode sections and the wires.

It is to be noted that in the aforementioned method of manufacturing the steps need not be carried out in the given order, and that these steps can be carried out in any order.

Furthermore, it is to be noted that the doping process, the photolithographic etching process and the etching layer removing process need not be carried out in the given order, and that these processes can be carried out in any order. For example, it is possible to carry out the photolithographic etching process, the doping process and the etching layer removing process in that order.

The etching layer is preferably a phosphorus glass film (PSG), an arsenic glass film (ASG) or the like. The rate at which a widely employed etchant such as buffered hydrofluoric acid (BHF) enters these materials is high, so that the etching process can be completed in a short time. In this case, the semiconductor thin film is, for example, polycrystal silicon or non-crystal (amorphous) silicon.

The aforementioned step of selective doping includes doping a predetermined portion of the semiconductor thin film with the dopant by means of ion implantation or the like in the photolithographic process. Basically, this step is carried out to form the electrode sections and the wires of the movable portion.

The operation of this aspect of the present invention will now be described in more detail.

According to the manufacturing method of the semiconductor micromachine, the diffusion inhibiting layer is provided on the etching layer, and the semiconductor layer constituting the movable portion is provided on the diffusion inhibiting layer. Hence, it is possible (a) to inhibit the dopant contained in the etching layer from being diffused into the semiconductor thin film; (b) to prevent an excessive amount of dopant from entering the electrical insulation section interconnecting the electrode sections and the wires of the movable portion, so that the conductivity of the electrical insulation section can be kept low; and (c) to obtain a semiconductor micromachine that ensures electrical insulation among the electrode sections and the wires.

On the other hand, should the dopant be diffused into the semiconductor thin film, the conductivity of the semiconductor thin film would be enhanced, the electrical insulation among the electrode sections thus would be compromised, and the movement of electric charges therebetween (crosstalk of electrical signals) would be induced.

As described hitherto, according to this manufacturing method, the dopant is not diffused from the etching layer over the entire surface of the semiconductor thin film. Accordingly, it is possible to manufacture a semiconductor micromachine whose respective electrodes and wires are securely separated from each other by the electrical insulation section.

According to still another aspect of the present invention, there is provided a manufacturing method of a semiconductor micromachine having a substrate, a movable portion arranged opposite the substrate with a gap interposed therebetween, the movable portion being made of a semiconductor layer and having a plurality of electrode sections and an electrical insulation section interconnecting the electrode sections, and supporting bodies for floatably supporting the movable portion, including the steps of: forming an etching layer made of a Ge thin film or a Si—Ge mixed crystal thin film on the substrate; forming a semiconductor thin film made of at least one of fourth group elements (Si, Ge and C) on the etching layer; selectively doping the semiconductor layer with a dopant; patterning the semiconductor layer by photolithographic etching to form holes for introducing an etchant, the plurality of electrode sections, the electrical insulation section, and the supporting bodies; and forming the gap and the semiconductor layer as the movable portion by removing the etching layer using the etchant.

Accordingly, the semiconductor layer is made of at least one of the Group 4A elements in the periodic table (Si, Ge and C). That is, the semiconductor thin film may be a Si thin film, a diamond (carbon) thin film, a Si—C—Ge thin film, a SiC thin film or a SiGe thin film. The Si thin film is made of either polycrystal Si or non-crystalline (amorphous) Si.

The etching rate of the semiconductor layer is preferably lower than that of the etching layer. Hence, during the etching process, it is possible to remove only the etching layer without causing damage to the semiconductor layer.

The etching layer and the semiconductor layer can be formed by means of CVD, sputtering or vacuum evaporation. The etching layer should be provided at least beneath the semiconductor thin film that constitutes the movable portion.

The aforementioned step of selective doping includes doping a predetermined portion of the semiconductor layer with the dopant by means of ion implantation or the like in the photolithographic process. Basically, this step is carried out to form the electrode sections and the wires of the movable portion.

It is to be noted that the aforementioned steps need not be carried out in the given order, and that these steps can be carried out in any order.

The operation of this aspect of the present invention will now be described in more detail.

According to the manufacturing method of the semiconductor micromachine, the etching layer is made of a Ge thin film or a Ge—Si mixed crystal thin film. That is, the etching layer contains few materials acting as a dopant for the semiconductor thin film, so that there is no possibility of a dopant being diffused from the etching layer into the semiconductor thin film. It is thus possible (a) to prevent an excessive amount of dopant from entering the electrical insulation section interconnecting the electrode sections and the wires of the movable portion, so that the conductivity of the electrical insulation section can be kept low; and (b) to obtain a semiconductor micromachine that ensures electrical insulation among the electrode sections and the wires.

On the other hand, should the dopant be diffused into the semiconductor thin film, the conductivity of the semiconductor thin film would be enhanced, the electrical insulation among the electrode sections thus would be invalidated, and the movement of electric charges therebetween (crosstalk of electrical signals) would be induced.

As described hitherto, this aspect of the present invention enables the manufacture of a semiconductor micromachine having a movable portion whose respective electrodes and wires are electrically separated from each other by an electrical insulation section reliably.

Besides an angular velocity sensor, the semiconductor micromachine that can be manufactured according to this manufacturing method includes an acceleration sensor, a microactuator and the like.

BRIEF DESCRIPTION OF THE DRAWINGS

Further objects, features and advantages of the present invention will become apparent from the following description of the preferred embodiments with reference to the accompanying drawings, wherein.

DESCRIPTION OF PREFERRED EMBODIMENTS

Figure 1:
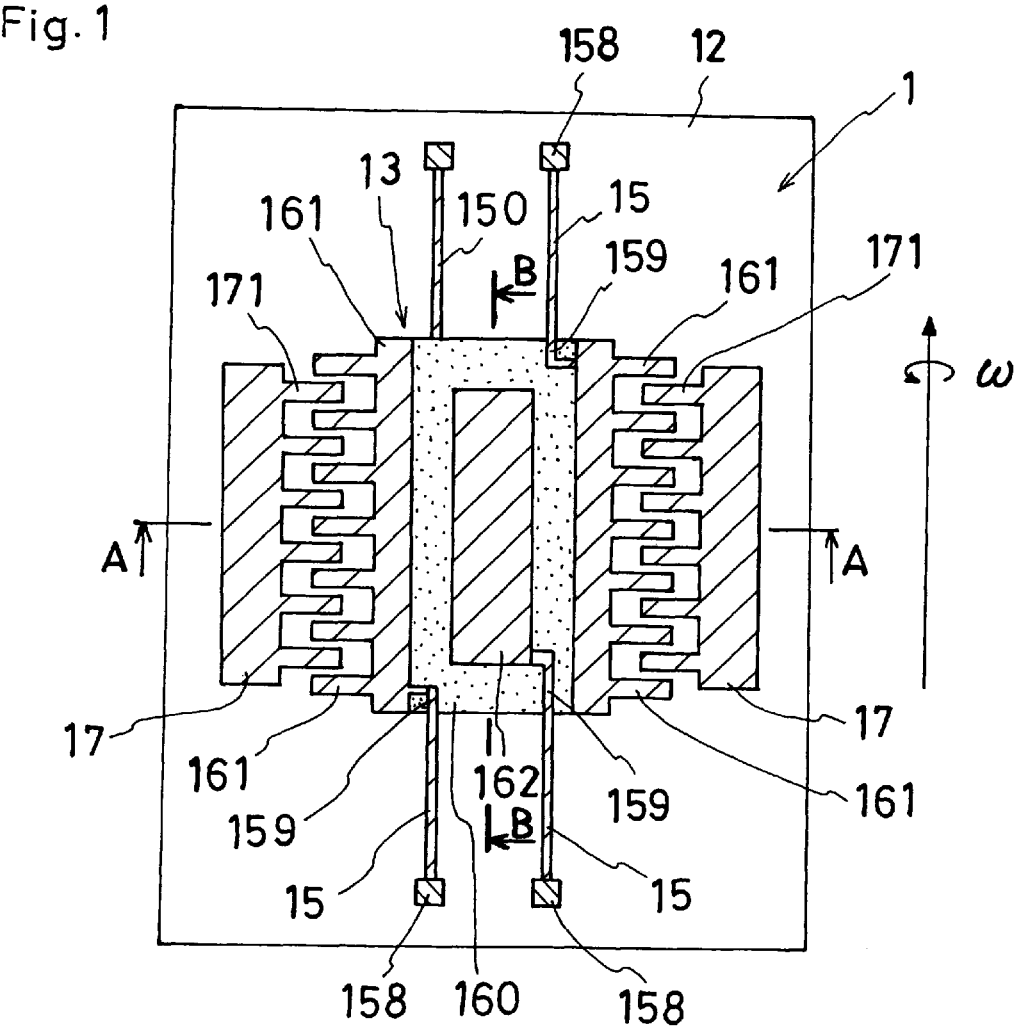
FIG. 1 is a plan view illustrating a semiconductor micromachine of a first embodiment of the present invention.

Referring now to the drawings, where like reference numerals refer to the same or corresponding parts throughout the several views, several embodiments of the present invention are next described.

First Embodiment

Figure 15:
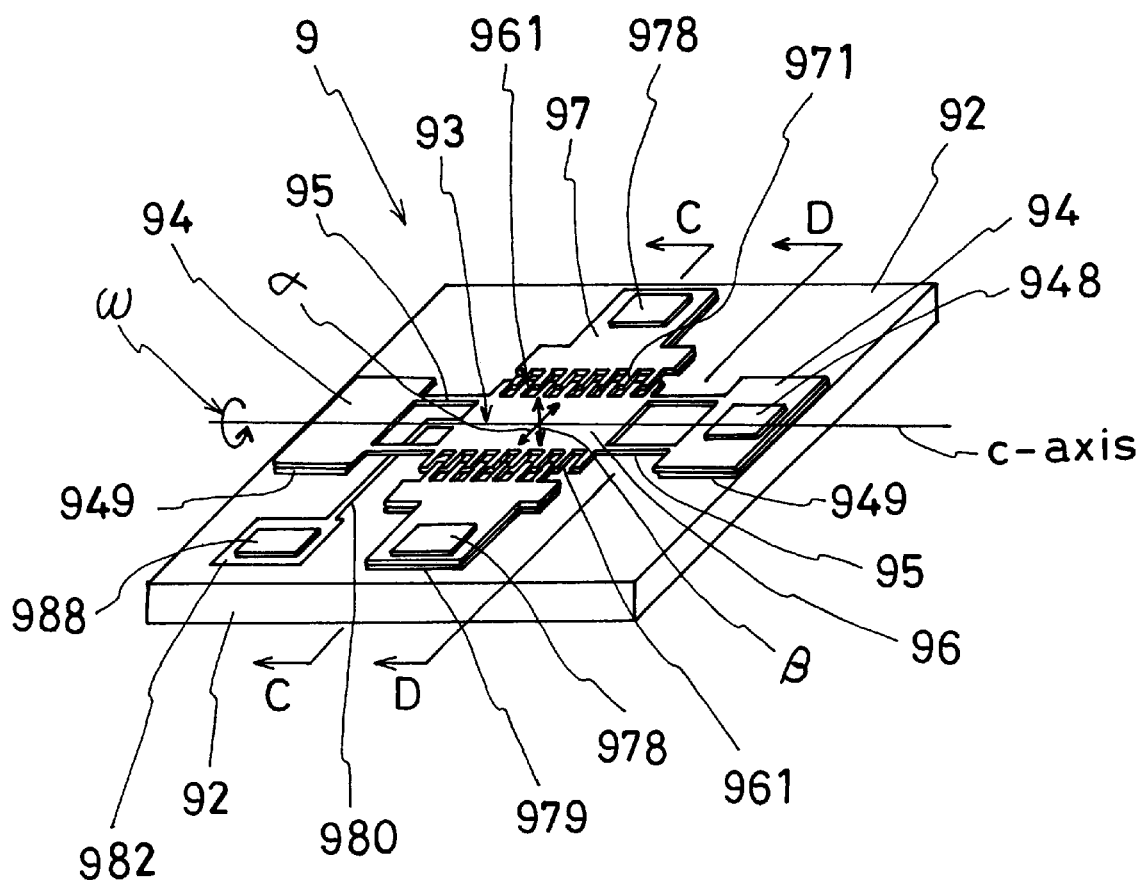
FIG. 15 is a prespective view illustrating a conventional semiconductor micromachine.
Figure 16:
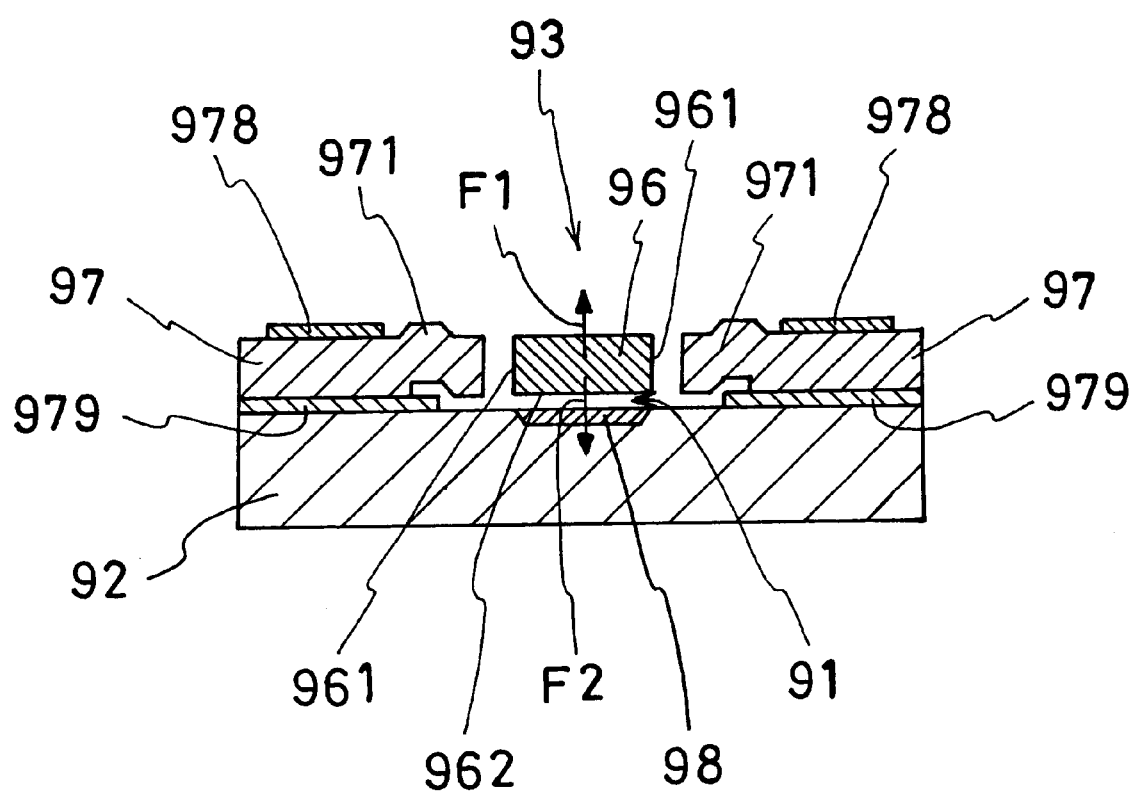
FIG. 16 is a cross sectional view taken along line C—C of the conventional semiconductor micromachine as illustrated in FIG. 15.
Figure 17:
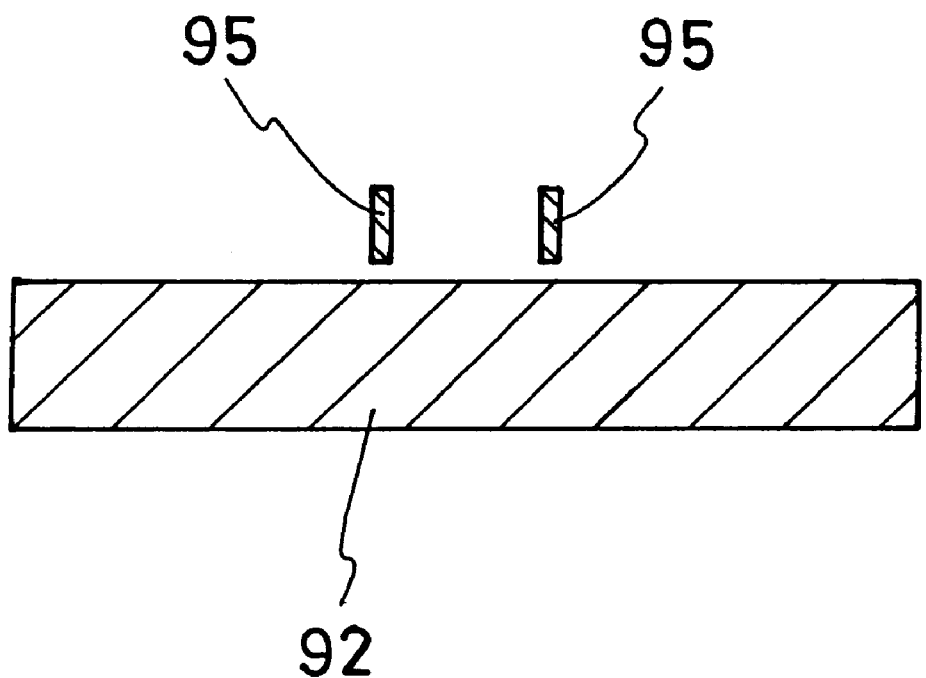
FIG. 17 is a cross sectional view taken along line D—D of the conventional semiconductor micromachine as illustrated in FIG. 15.
Figure 18:
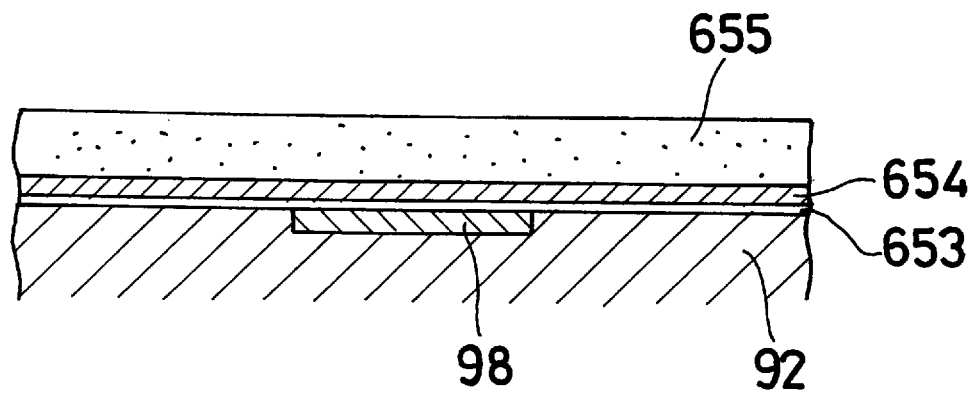
FIGS. 18a, 18b and 18c are cross-sectional views taken along line A—A in FIG. 22 and show process steps of the conventional manufacturing method.
Figure 18:
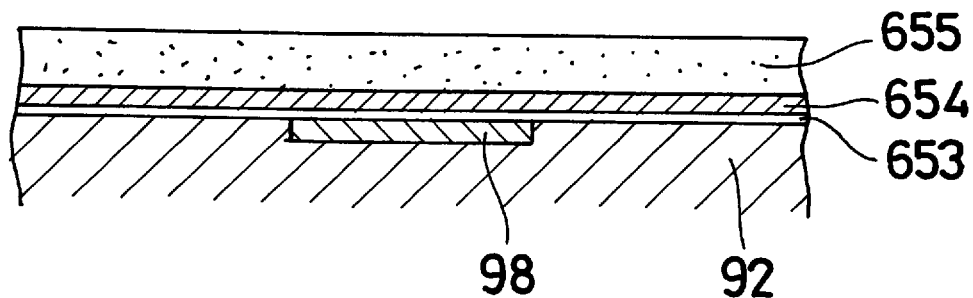
Figure 18:
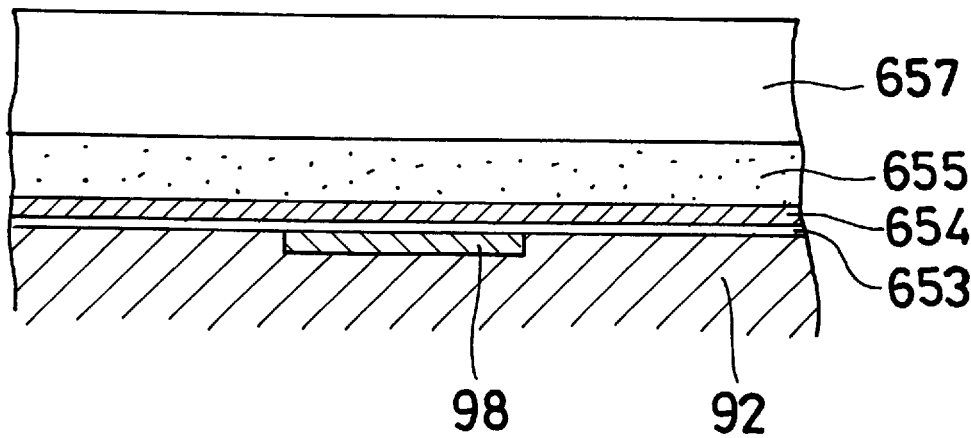
Figure 19:
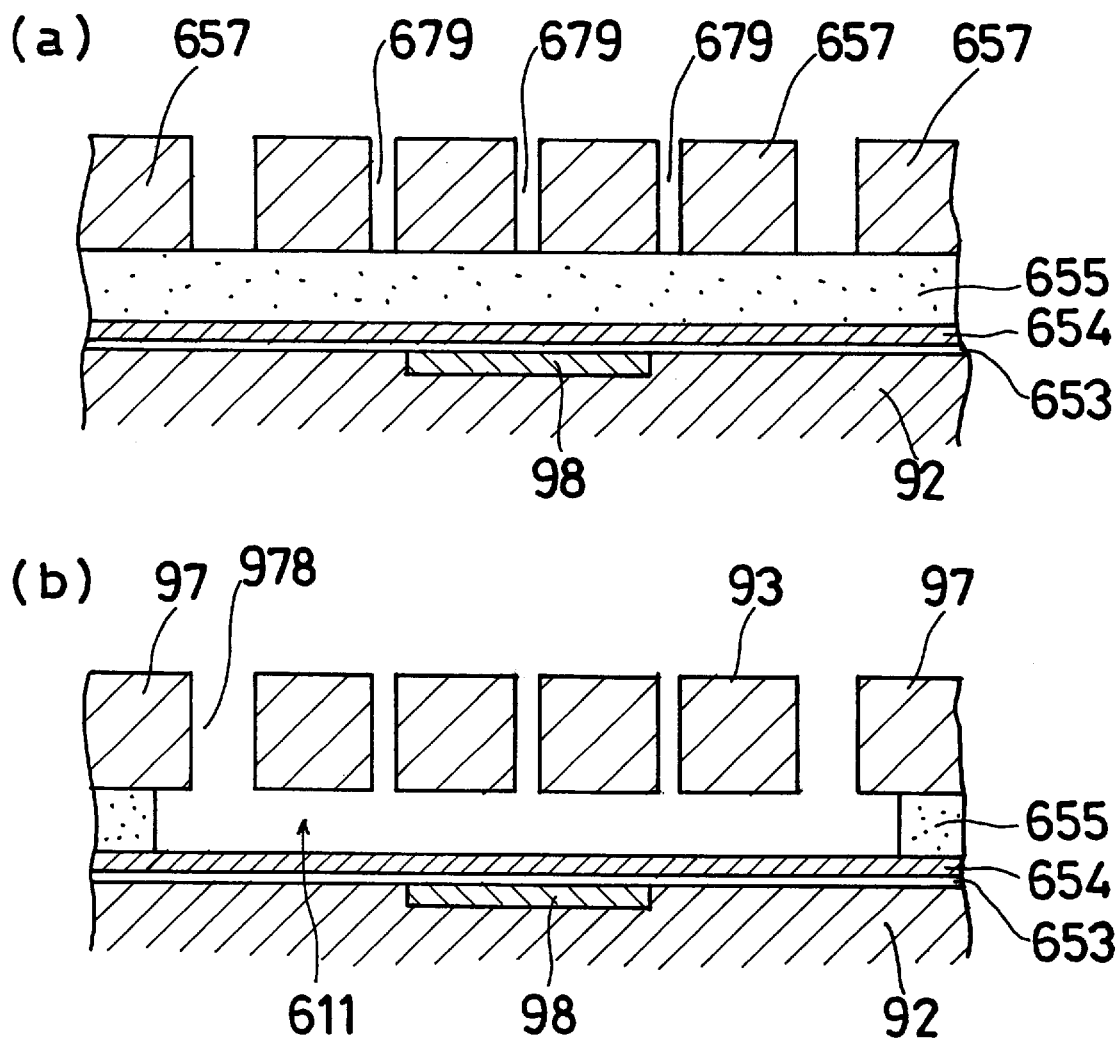
FIGS. 19a and 19b are cross-sectional views taken along line A—A in FIG. 22 and show a subsequent step of manufacturing the semiconductor micromachine according to the conventional manufacturing method.
Figure 20:
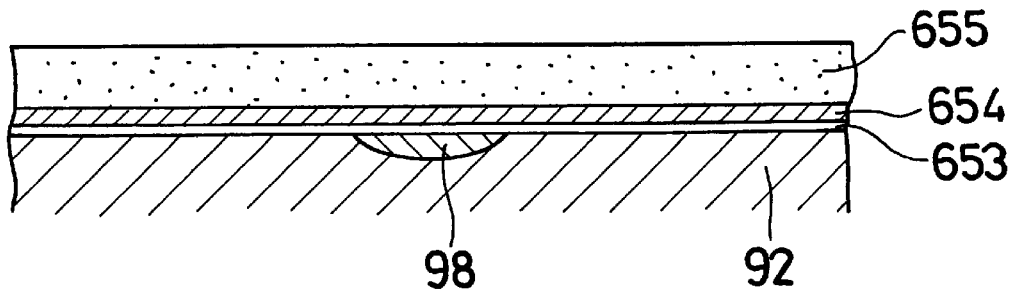
FIGS. 20a, 20b and 20c illustrate cross-sectional views taken along line B—B in FIG. 22 and show process steps of the conventional manufacturing method.
Figure 20:
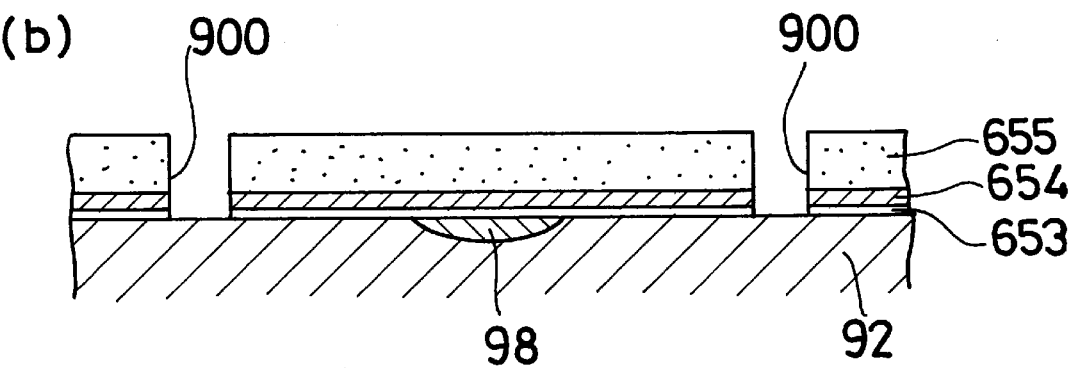
Figure 20:
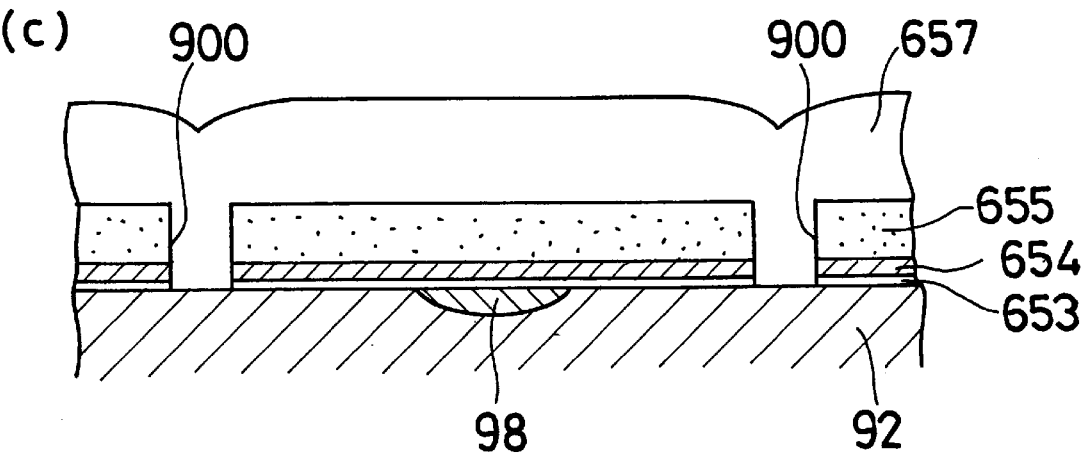
Figure 21:
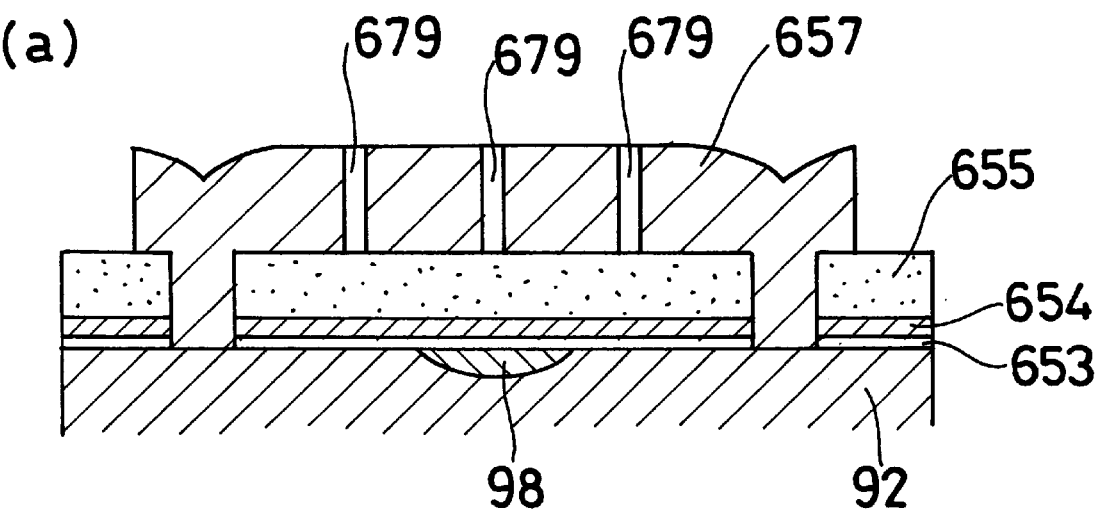
FIGS. 21a and 21b are cross-sectional views taken along line B—B in FIG. 22 and show a subsequent step of manufacturing the semiconductor micromachine according to the conventional manufacturing method.
Figure 21:
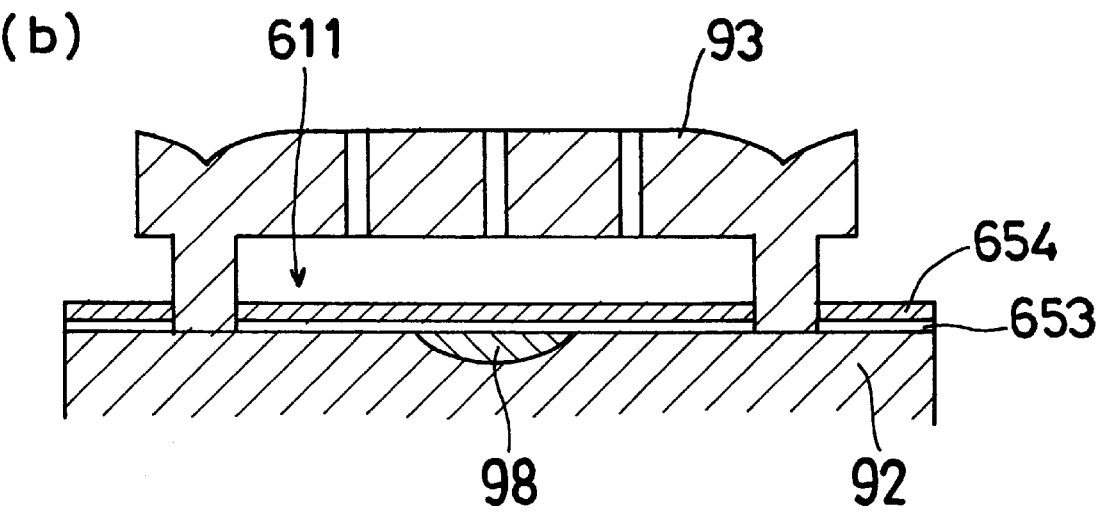
Figure 22:
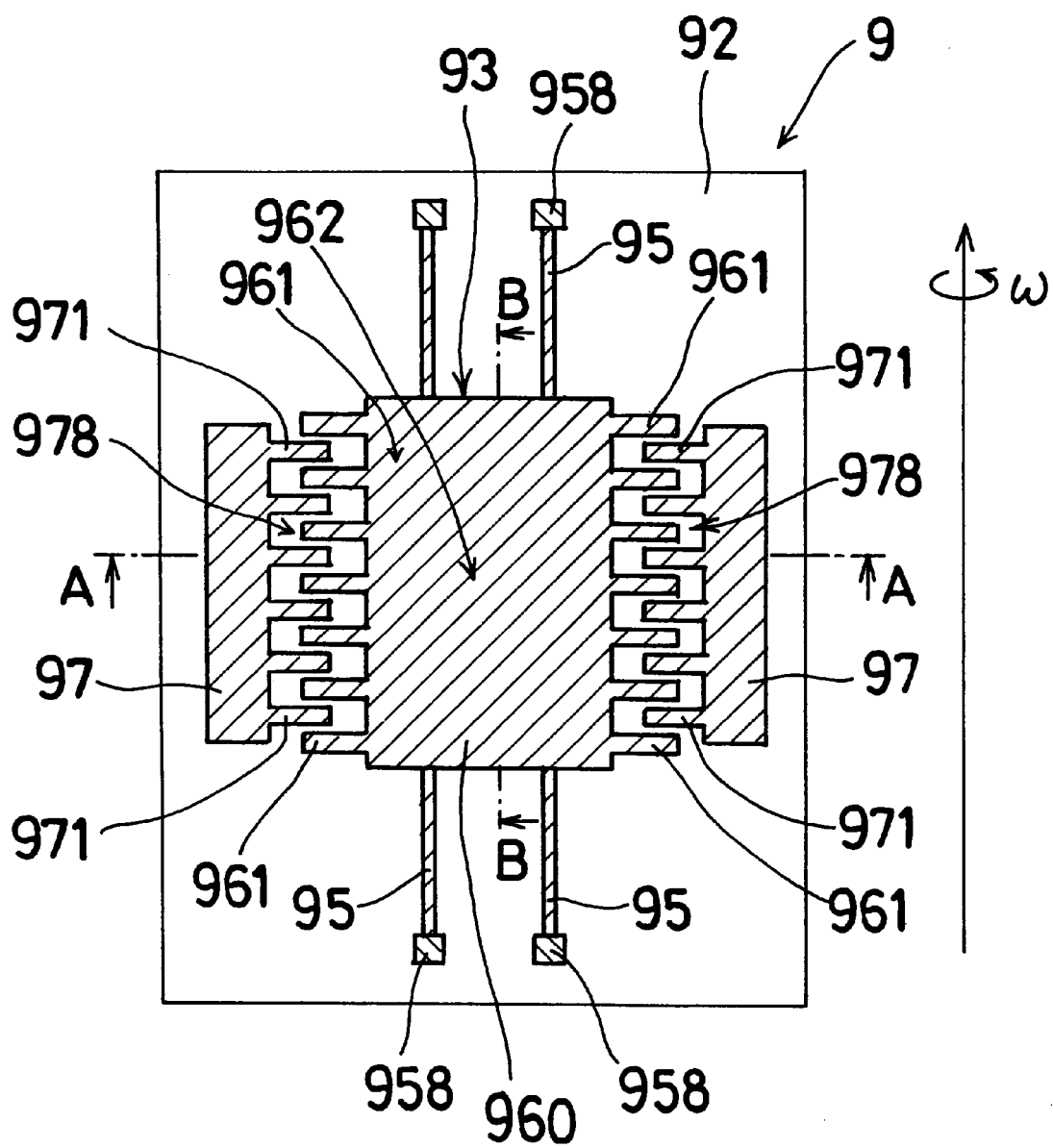
FIG. 22 is a schematic view illustrating a conventional semiconductor micromachine.

A semiconductor micromachine according to a first embodiment of the present invention will be described with reference to FIGS. 1, 2. The semiconductor micromachine of this embodiment is an angular velocity sensor manufactured by using micromachining technology, and the basic structure thereof is substantially the same as that of the conventional semiconductor micromachine (See FIGS. 15 through 17).

Figure 2:
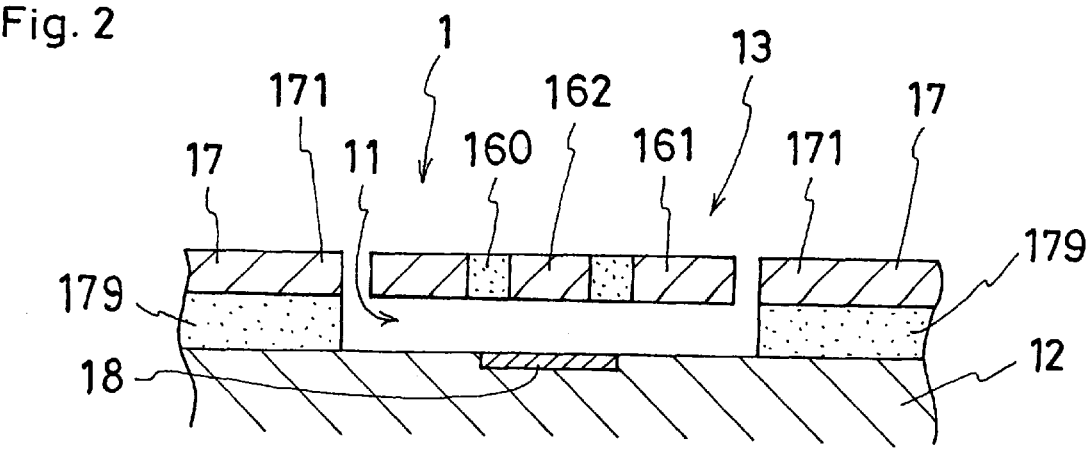
FIG. 2 is a cross sectional view taken along line A—A of the semiconductor micromachine of the first embodiment as illustrated in FIG. 1.

As shown in FIGS. 1, 2, the semiconductor micromachine 1 of this embodiment has a substrate 12 and a movable portion 13. The movable portion 13 is composed of a polycrystalline silicon thin film supported by acicular bodies 15, 150, and is arranged opposite the substrate 12 with a gap 11 provided therebetween. Provided in the movable portion 13 are an electrode and wires 159. The electrode is composed of movable-side driving electrode sections 161 and movable side detecting electrode section 162. The respective electrode sections and wires are interconnected by an electrical insulation section 160.

A pair of stationary portions 17 are secured to the substrate 12, and the movable portion 13 is disposed between the stationary portions 17.

The movable portion 13 has on both sides thereof the movable-side comb-shaped driving electrode sections 161. Each of the stationary portions 17 is provided with stationary-side comb-shaped driving electrode sections 171, which are arranged to be interdigitated with the driving electrode sections 161. A very narrow gap is formed between each movable-side driving electrode section 161 and each stationary-side driving electrode section 171.

Furthermore, the acicular bodies 15, 150 are unmovable with respect to the substrate 12. The driving and detecting electrode sections 161, 162 are connected with the acicular bodies 15 via the wires 159 respectively.

The stationary portions 17 are secured to the substrate 12 by a supporting layer 179.

As shown in FIG. 2, the substrate 12 has thereon a substrate-side distance detecting electrode 18, which is located opposite the detecting electrode section 162 of the movable portion 13. The distance detecting electrode 18 detects a distance between the substrate 12 and the movable portion 13, that is, the distance across the gap 11.

Each acicular body 15 has at one end thereof an electrode pad 158. The acicular body 150 only serves to support the movable portion 13.

The movable portion 13, the stationary portions 17, and the acicular bodies 15, 150 are all made of polycrystal silicon. The driving and detecting electrode sections 161, 162 and the acicular bodies 15 of the movable portion 13 and the stationary-side driving electrode sections 171 of the stationary portion 17 are made of an n-type semiconductor, which is made by doping polycrystal silicon using ion implantation of a dopant such as phosphorus. The electrical insulation section 160 is made of undoped polycrystal silicon.

The substrate 12 is made of p-type monocrystal silicon, and the distance detecting electrode 18 is made of n-type silicon, which is an electrically conductive material.

The aforementioned semiconductor micromachine 1 detects an angular velocity in the following manner.

As is the case with the conventional semiconductor micromachine 9, an alternating-current voltage of a rectangular waveform ranging from 0 to $V_0$ (V) is applied in parallel with the substrate 12 between each stationary-side comb-shaped electrode section 171 and each driving electrode section 161. This alternating-current voltage has a resonance frequency for the movable portion 13.

The movable portion 13 is thus caused to vibrate horizontally, that is, in a direction parallel to the substrate 12.

In this state, by causing the semiconductor micromachine 1 to rotate upon a rotational axis as illustrated in FIG. 1 at an angular velocity $\omega$, the movable portion 13 starts to vibrate in a direction perpendicular to the substrate 12.

When the movable portion 13 vibrates vertically, the distance between the movable portion 13 and the substrate 12 across the gap 11 changes in accordance with a frequency of the vibration.

The distance detecting electrode section 18 and the detecting electrode section 162 in the movable portion 13 constitute a condenser whose electrostatic capacity changes in accordance with a change in the distance across the gap 11.

Accordingly, it is possible to detect change in the distance across the gap 11 as an electric signal value, by detecting the electrostatic capacity determined by a circuit. The value thus detected serves to detect an angular velocity $\omega$ of the semiconductor micromachine 1.

The operation and effect of this embodiment will now be described.

In the semiconductor micromachine 1 of this embodiment, the driving electrode sections 161, the detecting electrode section 162, and the wires 159 are interconnected by the electrical insulation section 160.

Therefore, the driving electrode sections 161, the detecting electrode section 162, and the wires 159 are electrically independent of each other.

Accordingly, there are few electric charges moving between these electrically independent portions, which hardly allows crosstalk of signals to occur. Due to an unlikely possibility of crosstalk of signals, the S/N ratios in the driving electrode sections 161, the detecting electrode section 162 and the wires 159 can be enhanced.

The semiconductor micromachine 1 of this embodiment is thus capable of detecting an angular velocity with high precision.

Furthermore, it is possible to control a current flowing through a certain driving electrode section 161, a certain detecting electrode section 162 or a certain wire 159 independently of the current flowing through other portions. Similarly, it is possible to control a voltage applied to a certain driving electrode section 161, a certain detecting electrode section 162 or a certain wire 159 independently of the voltage applied to other portions. Accordingly, the degree of design freedom for a circuit in the semiconductor micromachine 1 can be enhanced.

As described hitherto, this embodiment provides a semiconductor micromachine with a high S/N ratio and a high degree of design freedom that is capable of preventing crosstalk of signals among a plurality of electrodes and wires.

Although the movable portion 13, the stationary portions 17, and the acicular bodies 15, 150 of this embodiment are formed of a semiconductor thin film of non-crystalline (amorphous) silicon, SiC, SiGe or SiCGe. The semiconductor thin film of any of these materials can be manufactured under a normal silicon IC process, which boosts mass-productivity and yields. In the case where the semiconductor thin film is made of polycrystal silicon or non-crystal silicon, the manufacturing process thereof can be carried out at a lower temperature. By manufacturing the semiconductor thin film at a lower temperature, it is possible to inhibit re-diffusion of a dopant in a subsequent process, thus realizing a condition suitable for grain refinement.

In this embodiment, the respective electrode sections and wires of the movable portion 13 are made of an n-type semiconductor, and the-electrical insulation section is made of an undoped semiconductor. However, the respective electrode sections or wires may be made of a p-type semiconductor. Due to a construction where the p-type semiconductor is used, the manufacturing process can be facilitated, and the respective capacitance values determined by the electrodes can be reduced. Accordingly, it is possible to reduce the possibility of crosstalk of signals occurring between the electrodes.

The n-type semiconductor is preferably obtained by doping polycrystal silicon, non-crystal silicon or the like with a dopant such as phosphorus, arsenic, antimony or the like. It is thus possible to obtain a low-resistance n-type semiconductor and reduce signal delays resulting from parasitic capacitance. On the other hand, the p-type semiconductor is preferably obtained by doping polycrystal silicon, non-crystal silicon or the like with a dopant such as boron, gallium, indium or the like. It is thus possible to achieve a conductivity approximate to that of the low-resistance n-type semiconductor and obtain a semiconductor micromachine of higher performance.

In addition, the semiconductor constituting the electrical insulation section 160 may be different in type from the semiconductor constituting the respective electrodes or wires 159. That is, in the case where the respective electrodes or wires are made of an n-type semiconductor, the electrical insulation section 160 is made of a p-type semiconductor, whereas in the case where the respective electrodes 161,162 or wires are made of a p-type semiconductor, the electrical insulation section 160 is made of an n-type semiconductor. In this manner, there is formed in the movable portion 13 an npn-connection or a pnp-connection which prevents electric charges from moving between the electrodes and the electrical insulation section 160. In this case, an undoped semiconductor may be interposed between the electrode sections 161,162 and the electrical insulation section 160. It is thus possible to prevent the movement of electric charges between the electrode sections 160 and the electrical insulation section more reliably.

Furthermore, it is preferable that the carrier density of the electrical insulation section 160 be lower than that of the respective electrodes/wires. In general, in the interface between the p-type and n-type semiconductors, the number of electrons moving diffusely or in any other manner is very small due to recombination, and there is formed a depletion layer where only ionized electrons exist. This depletion layer tends to spread towards a side of lower carrier densities. This depletion layer, where virtually no carriers exist, has a low electrical conductivity. Accordingly, the depletion layer is formed on the side of the electrical insulation section 160 by lowering the carrier density thereof. It is thus possible to prevent the depletion layer from being formed on the side of the electrodes or the wires. In the case where the depletion layer is formed on the side of the electrodes or the wires, the effective active area of the electrodes or the wires is reduced by the area of the depletion layer.

Second Embodiment

A semiconductor micromachine according to a second embodiment of the present invention will now be described.

Figure 3:
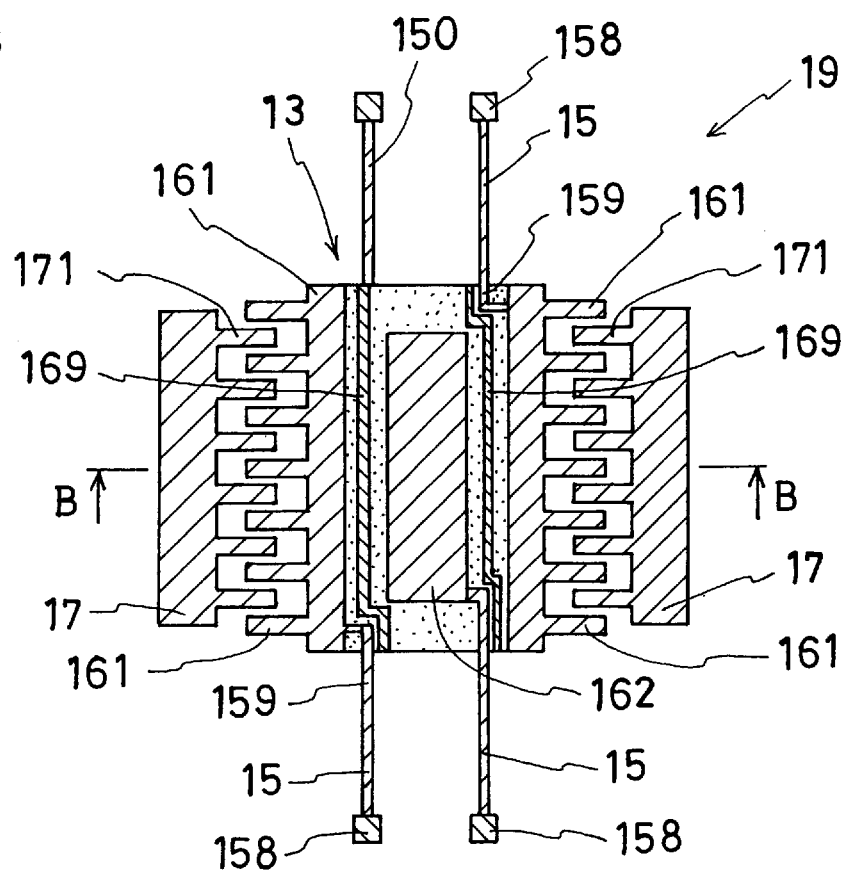
FIG. 3 is a plan view illustrating a semiconductor micromachine of a second embodiment of the present invention.

The semiconductor micromachine 19 as illustrated in FIG. 3 includes the movable portion 13, which has on both sides thereof the comb-shaped driving electrode sections 161. The detecting electrode section 162 constitutes a central portion of the movable portion 13. The movable portion 13 is also provided with the wires 159 for electrically connecting the detecting and driving electrode sections 162, 161 with the acicular bodies 15.

The driving electrode sections 161, the detecting electrode section 162, and the wires 159 are interconnected by the electrical insulation section 160.

The movable portion 13 is made of an undoped polycrystalline silicon, while the driving electrode sections 161, the detecting electrode section 162, and the wires 159 are each made of an n-type semiconductor manufactured by doping the aforementioned polycrystalline silicon using ion implantation of phosphorus.

Figure 4:
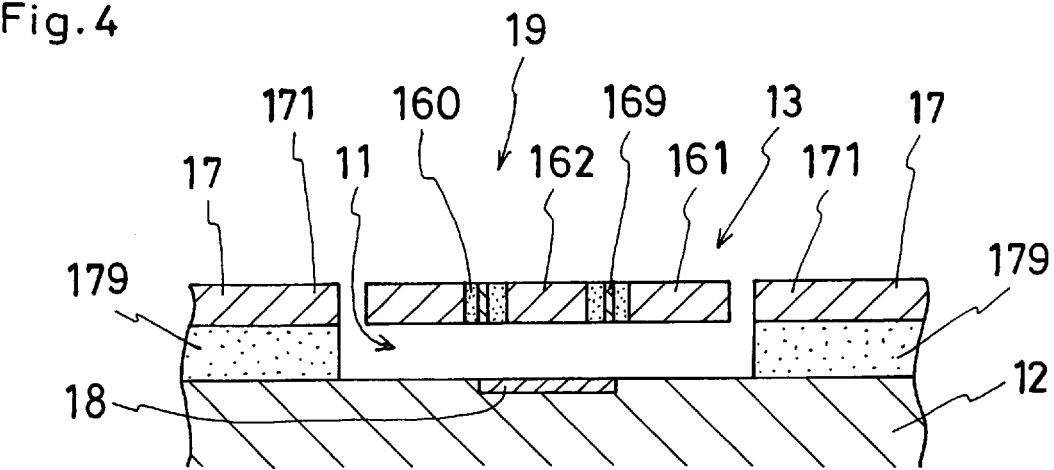
FIG. 4 is a cross sectional view taken along line B—B of the semiconductor micromachine of the second embodiment as illustrated in FIG. 3.

As shown in FIGS. 3, 4, the material interconnecting the driving electrode sections 161, the detecting electrode section 162 and the wires 159 remains undoped. This undoped material constitutes the electrical insulation section 160.

Additionally, provided at the center of the electrical insulation section 160 is a central portion 169, which is made of p-type semiconductor manufactured by doping the polycrystalline silicon using ion implantation of boron. According to this construction, the driving electrode sections 161, the detecting electrode section 162, and the wires 159, which are made of n-type semiconductor respectively are insulated completely by existence of undoped electrical insulation section 160 and the central portion 169 made of p-type semiconductor therebetween.

In other respects, this embodiment is identical to the first embodiment.

The operation and effect of the semiconductor micromachine 19 of this embodiment are substantially the same as those of the first embodiment.

Third Embodiment

A semiconductor micromachine according to third embodiment of the present invention will now be described.

Figure 6:
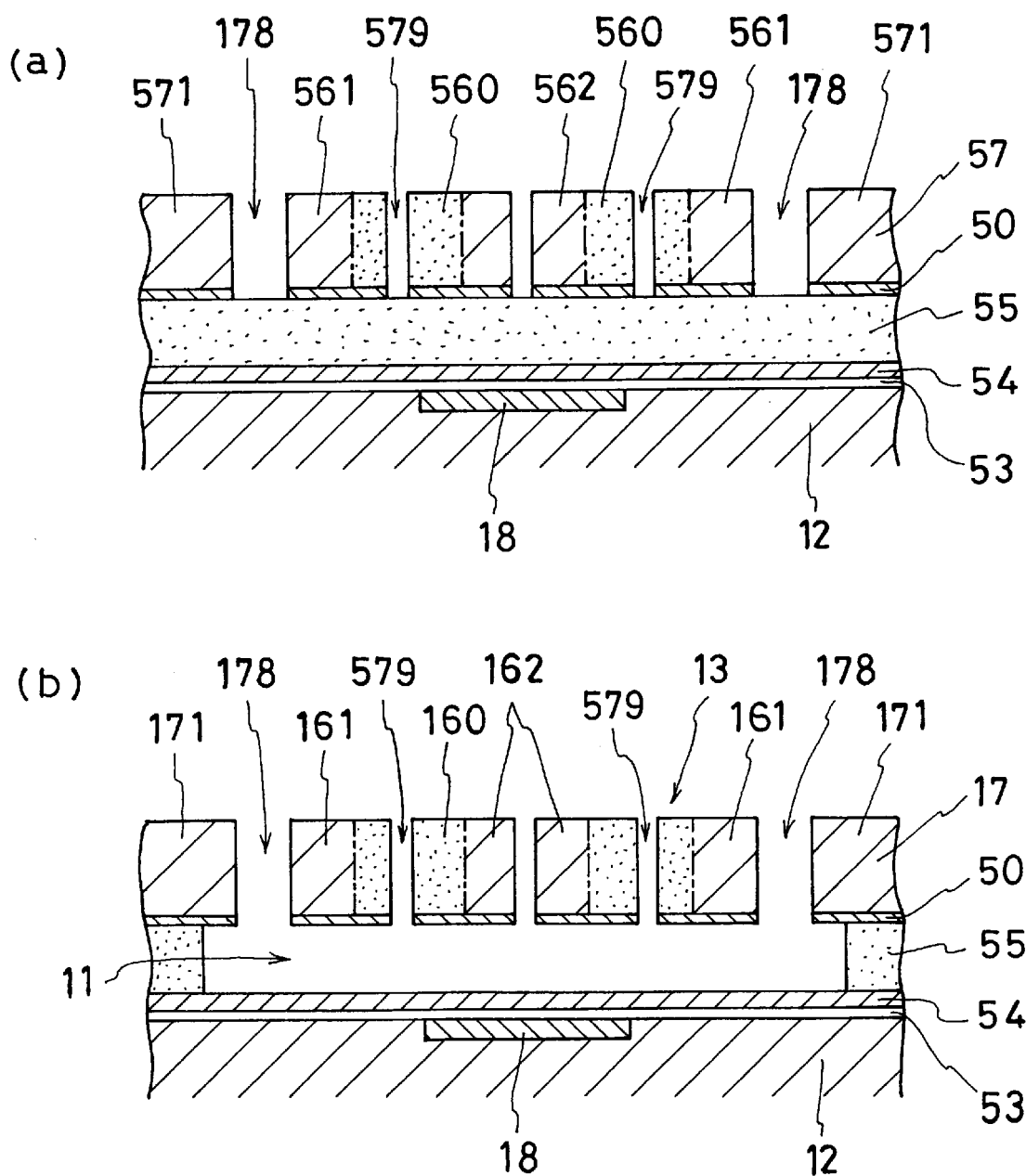
FIGS. 6(a) and 6(b) illustrate a subsequent step of manufacturing the semiconductor micromachine according to the first manufacturing method as illustrated in FIG. 5.
Figure 7:
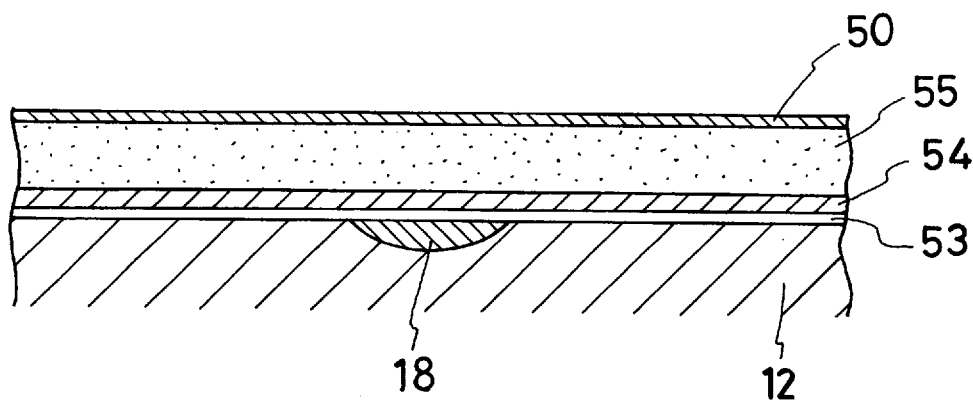
FIGS. 7a, 7b and 7c illustrate cross-sectional views taken along line B—B in FIG. 1 and show process steps of the first manufacturing method.
Figure 7:
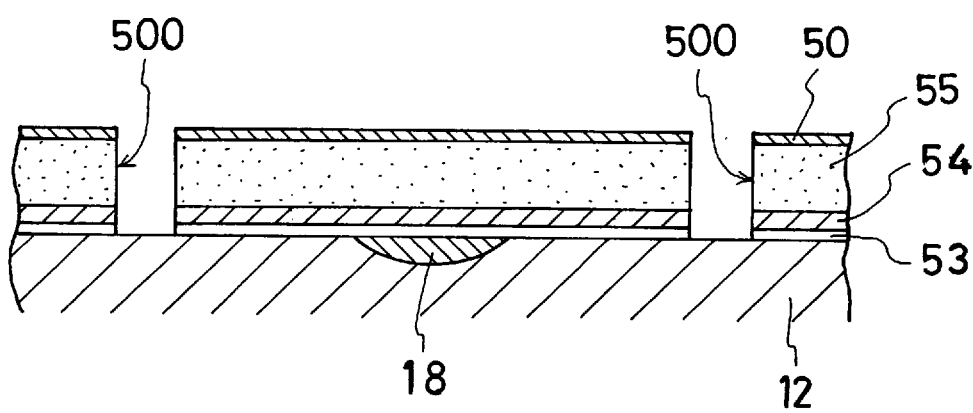
Figure 7:
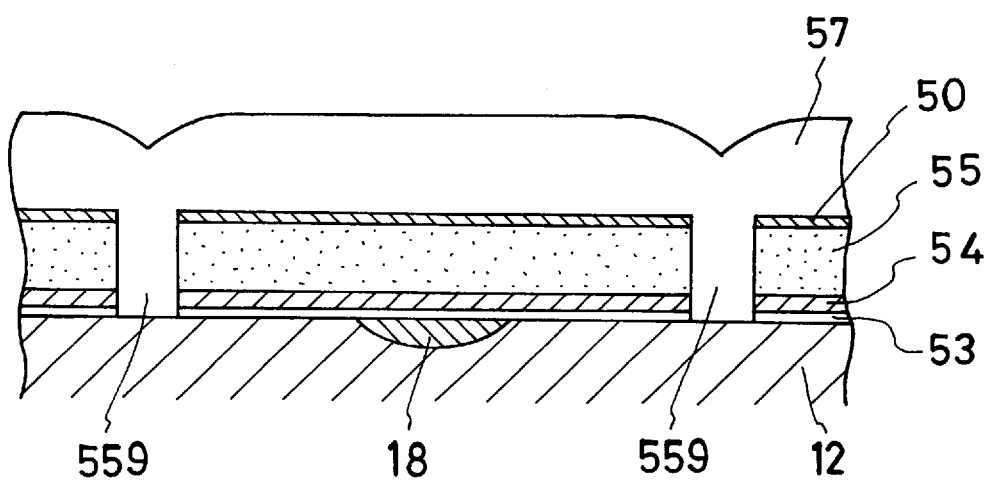
Figure 8:
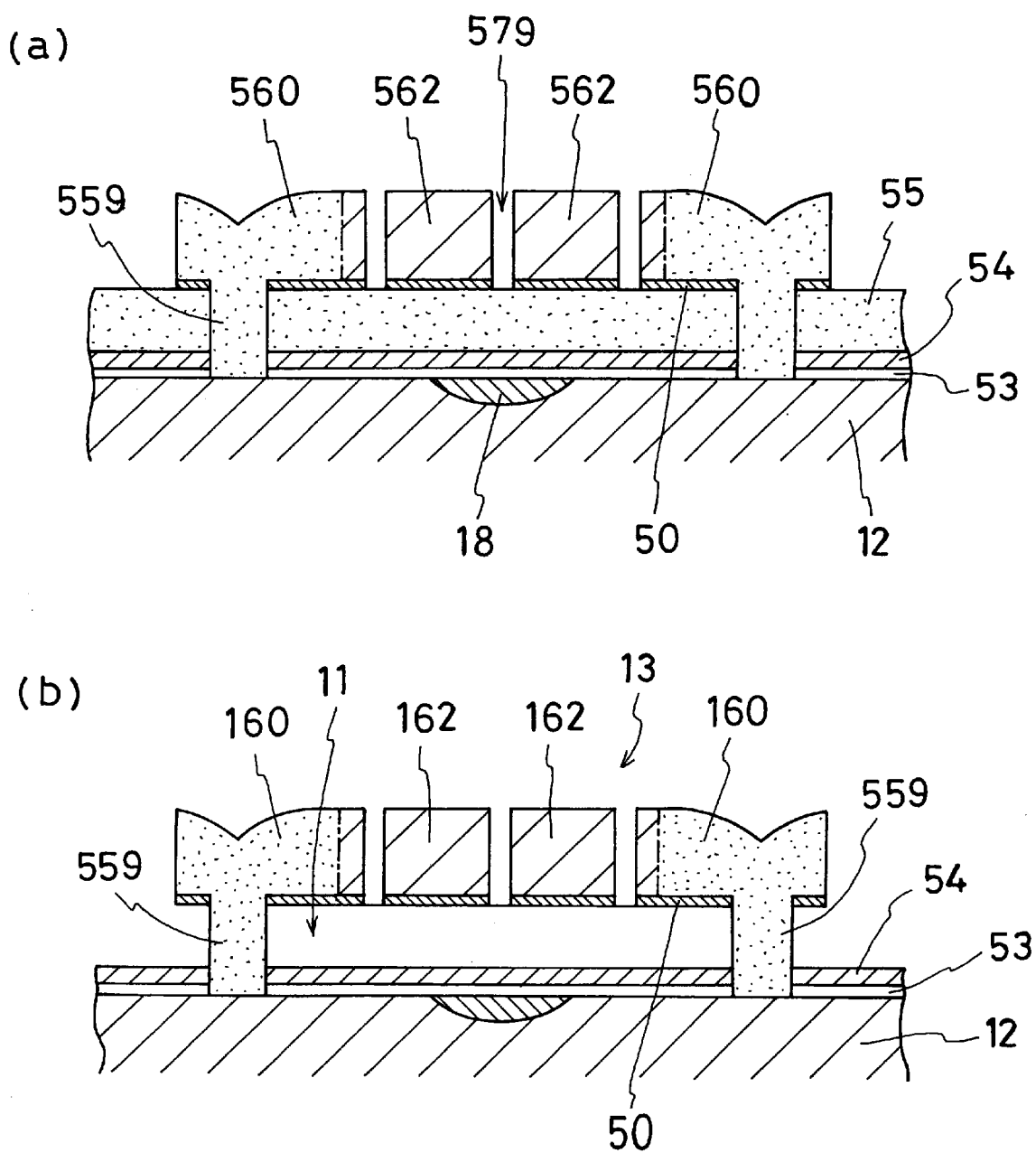
FIGS. 8(a) and 8(b) illustrate a subsequent step of manufacturing the semiconductor micromachine according to the first manufacturing method as illustrated in FIG. 7.

The semiconductor micromachine of this embodiment is basically identical to that of the first embodiment except that a diffusion inhibiting layer 50 is formed on a bottom surface of the movable portion 13 facing the gap portion 11 as illustrated in FIG. 6(b). A concrete construction of this embodiment is apparent from FIGS. 1, 2 for illustration of the first embodiment, and hence, the explanation thereof is omitted.

The overall manufacturing method of this semiconductor micromachine will now-be described with reference to FIGS. 5 through 8.

First, the substrate 12 having on a surface thereof an oxidation film 53 and an etching stopper layer 54 is prepared. Subsequently, an etching layer 55 is then provided on the etching stopper layer 54. A diffusion inhibiting layer 50 is then provided on the etching layer 55, and a semiconductor thin film 57 is then provided on the diffusion inhibiting layer 50. Thereafter, the semiconductor thin film 57 is selectively doped with a dopant. This process of selective doping may be accompanied by a thermal treatment, for example, to reduce internal stresses.

The semiconductor thin film 57 is then subjected to photolithographic etching. This photolithographic etching provides the semiconductor thin film 57 with a predetermined pattern and introduction holes 579 leading to the etching layer 55. The predetermined pattern is a pattern that forms the acicular bodies 15, 150, the stationary portions 17, and the movable portion 13 as illustrated in FIG. 1.

Subsequently, the etching layer 55 is removed. This process forms the aforementioned gap portion and thus enables the movable portion 13 to move.

The semiconductor micromachine can be manufactured in the aforementioned steps. By adding another step of removing the diffusion inhibiting layer 50 to these steps, it also becomes possible to manufacture the semiconductor micromachines as described in the first and second embodiments.

The diffusion inhibiting layer 50 is preferably subjected to a patterning process. In the case where the diffusion inhibiting layer 50 is subjected to a patterning process, it is possible to selectively dope the semiconductor thin film 57 using a dopant contained in the etching layer 55 at the time of a thermal treatment. This makes it possible to carry out the thermal treatment and the formation of electrodes or the like simultaneously, thus achieving an enhanced efficiency in manufacturing the semiconductor micromachine.

A concrete manufacturing method of the semiconductor micromachine of this embodiment will now be described.

First Manufacturing Method

As shown in FIGS. 5(a), 7(a), the distance detecting electrode 18 or the like is provided on the substrate 12 made of p-type monocrystalline silicon. This distance detecting electrode 18 is obtained by using a resist pattern formed by a photolithographic process as a mask, doping a predetermined portion thereof with phosphorus by means of ion implantation, and carrying out a thermal treatment.

The substrate thus constructed constitutes the substrate 12 of the semiconductor micromachine 1.

The distance detecting electrode 18 or the like may be made of an n-type polycrystalline silicon thin film. In this case, the substrate 12 may be an insulating substrate made of sapphire, glass or the like.

Alternatively, the distance detecting electrode 18 may be formed by doping a p-type polycrystalline substrate with an n-type dopant. Also, the aforementioned distance detecting electrode or the like may be formed of an n-type polycrystal Si, by providing an insulating film of SiN, SiON, $SiO_2$ or the like on an electrically conductive substrate of monocrystalline silicon, polycrystalline silicon, stainless or the like.

A silicon oxidation film 53 is provided on the substrate 12 by means of oxidation in the $O_2$ atmosphere. Furthermore, the etching stopper layer 54 is provided on the silicon oxidation film 53 by an LP-CVD method where $SiH_4$ and $NH_3$ are used as a source gas.

The silicon oxidation film 53 serves to protect the distance detecting electrode 18 or the like, and the etching stopper layer 54 serves to prevent an etchant used in a later-described etching process from eroding the substrate 12. The etching stopper layer 54 is made of $Si_3N_4$.

In the case where the distance detecting electrode 18 or the like of n-type polycrystal Si or n-type monocrystal Si is formed in a substrate having a surface whose etching rate for BHF (buffered hydrofluoric acid) is lower than for PSG (phosphoglass), the silicon oxidation film 53 and the etching stopper layer 54 are not absolutely indispensable.

Figure 5:
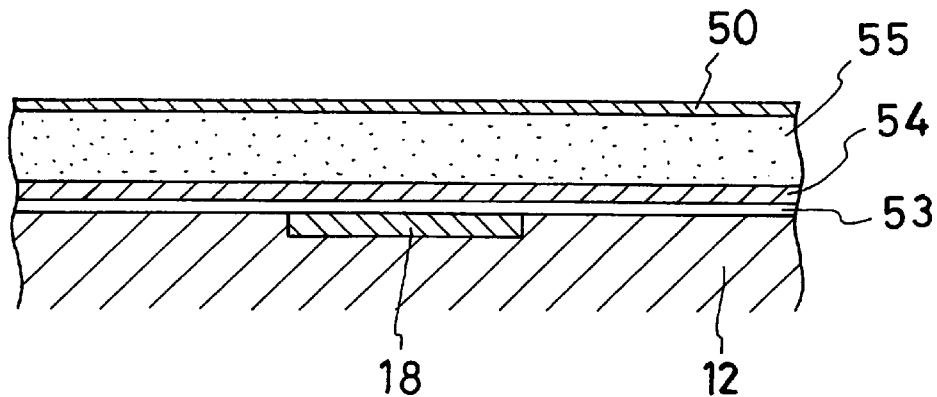
FIGS. 5a, 5b and 5c illustrate cross-sectional views taken along line A—A in FIG. 1 and show process steps of the first manufacturing method.
Figure 5:
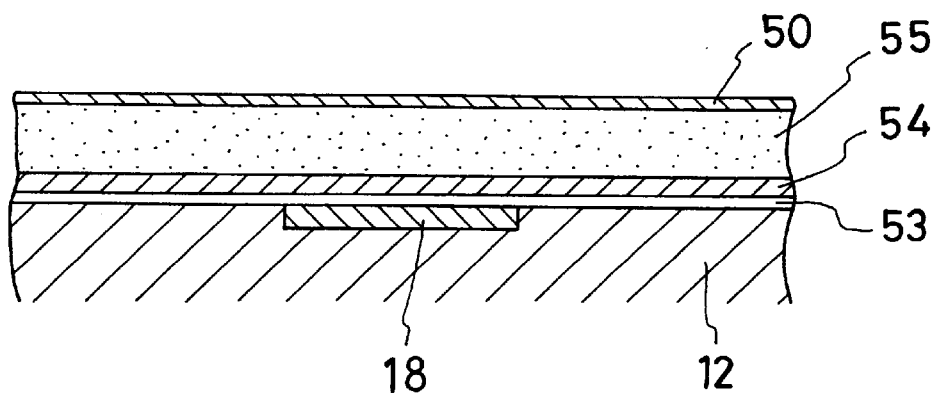
Figure 5:
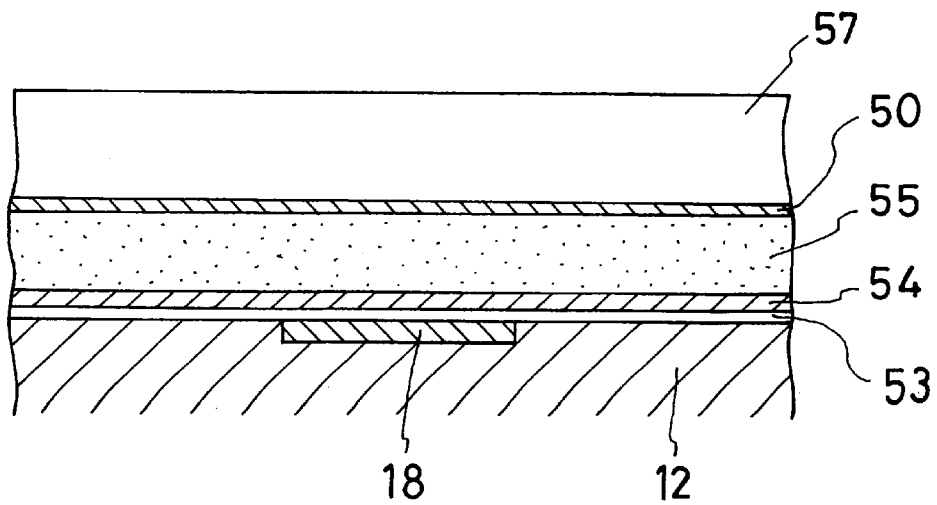

As shown in FIGS. 5(i a), 7(a), the etching layer 55 is provided on the etching stopper layer 54 by the LP-CVD method where $SiH_4$, $O_2$ and $PH_3$ are used as a source gas. The etching layer 55 is made of PSG.

Subsequently, the diffusion inhibiting layer 50 is provided on the etching layer 55 by the LP-CVD method where $SiH_4$—$NH_3$ is used as a source gas. The diffusion inhibiting layer 50 is made of $Si_3N_4$.

As shown in FIGS. 5(b), 7(b), contact holes 500 penetrating the silicon oxidation film 53, the etching stopper layer 54, the etching layer 55 and the diffusion inhibiting layer 50 are formed using photolithographic etching.

Thereafter, as shown in FIGS. 5(c), 7(c), the semiconductor thin film 57 is provided on the diffusion inhibiting layer 50 by the LP-CVD method where $SiH_4$ is used as a source gas. The semiconductor thin film 57 constitutes the movable portion 13 and the acicular bodies 15, 150 of the semiconductor micromachine 1.

In this case, the semiconductor thin film 57 fills the contact holes 500, thus forming leg portions 559 integrated therewith. The leg portions 559 serve to support the acicular bodies 15, 150 of the semiconductor micromachine 1. The semiconductor thin film 57 is made of polycrystal silicon.

The semiconductor thin film 57 is then provided with a resist pattern that is formed by a photolithographic process as a mask, and doped with phosphorus as a dopant by means of ion implantation. This doping process provides the semiconductor thin film 57 with doping areas 561, 562 and 571 that are used as the detecting electrode section 162, the driving electrode sections 161, and the stationary-side driving electrode sections 171 of the semiconductor micromachine 1.

Arsenic may also be used as a dopant for ion implantation.

An undoped area 560 that is left undoped is provided between the doping areas 561, 562. The undoped area 560 constitutes the electrical insulation section 160 of the finished semiconductor micromachine 1.

In this case, the electrical insulation section 160 may be entirely or partially subjected to ion implantation of boron.

The substrate 12 is then subjected to a thermal treatment in the nitrogen atmosphere at 1000° C. for 30 minutes in an annealing furnace. This thermal treatment reduces internal stresses generated in the semiconductor thin film 57 during the aforementioned processes and activates the dopant contained therein.

Instead of ion implantation of an n-type dopant in the semiconductor thin film 57, the doping areas 561, 562 and 571 may be formed by selectively diffusing phosphorus or arsenic in a vapor phase or a solid phase from the surface of the semiconductor thin film 57.

The aforementioned selective diffusion in a vapor phase includes the steps of forming a thin film containing no n-type dopant such as a BSG film, a SiN film, SiON film or the like, patterning the thin film in a photolithographic etching process, and subjecting it to a thermal treatment in the P or As atmosphere.

The aforementioned selective diffusion in a solid phase includes the steps of forming and patterning a thin film such as a BSG film, a SiN film, SiON film or the like, forming subsequently another thin film containing a dopant such as a PSG film, an ASG film or the like, and subjecting the thin film containing the dopant to a thermal treatment in the nitrogen atmosphere. The PSG film, the ASG film, the BSG film, the SiN film and the SiON film may be removed after the thermal treatment.

As shown in FIGS. 6(a), 8(a), the semiconductor thin film 57 is subjected to a photolithographic etching process to form a resist pattern, which is used as a mask in an anisotropic etching process by means of RIE. In this manner, the portions constituting the movable portion 13, the driving electrode sections 161 provided adjacent to the movable portion 13, the acicular bodies 15, 150, the stationary portions 17, and the stationary-side driving electrode sections 171 are formed.

These portions are provided with many introduction holes 579 for introducing a later-described etchant thereinto, the introduction holes 579 having a square cross section whose side length is about 4 $\mu$m.

Subsequently, the etching layer 55 is subjected to an etching process. In this etching process, buffered hydrofluoric acid is used as an etchant.

In the aforementioned etching process, the etchant passes through the introduction holes 579, reaches the etching layer 55 beneath the semiconductor thin film 57, and erodes the etching layer 55.

In this manner, as shown in FIGS. 6(b), 8(b), the gap portion 11 is formed between the semiconductor thin film 57 and the substrate 12.

Thereafter follow the steps of pure water cleaning, alcohol (IPA)-substitution, and desiccation, so that the semiconductor micromachine 1 is obtained.

The operation and effect of this manufacturing method will now be described.

In the aforementioned manufacturing method of the semiconductor micromachine 1, the diffusion inhibiting layer 50 is provided on the etching layer 55, and the semiconductor thin film 57 constituting the movable portion 13 is provided on the diffusion inhibiting layer 50.

It is thus possible to inhibit the dopant contained in the etching layer 55 from being diffused into the semiconductor thin film 57.

Accordingly, it is possible to prevent an excessive amount of dopant from entering the electrical insulation section 160 that interconnects the driving electrode sections 161 and the detecting electrode section 162 of the movable portion 13, thereby keeping the conductivity of the electrical insulation section 160 low. It is thus possible to provide the high-performance semiconductor micromachine 1 which ensures electrical insulation among the driving electrode sections 161 and the detecting electrode section 162.

Should the dopant be diffused into the semiconductor thin film 57, the conductivity of the semiconductor thin film 57 would be enhanced, the electrical insulation among the electrode sections 161, 162 thus would be compromised, and the movement of electric charges therebetween (crosstalk of electrical signals) would be induced.

As described hitherto, according to this manufacturing method, the dopant is not diffused from the etching layer 55 over the entire surface of the semiconductor thin film. Accordingly, it is possible to manufacture a semiconductor micromachine whose respective electrodes and wires are securely separated from each other by the electrical insulation section 160.

Second Manufacturing Method

Another concrete manufacturing method of the semiconductor micromachine, which is different from the first manufacturing method as described above, will now be described.

Figure 9:
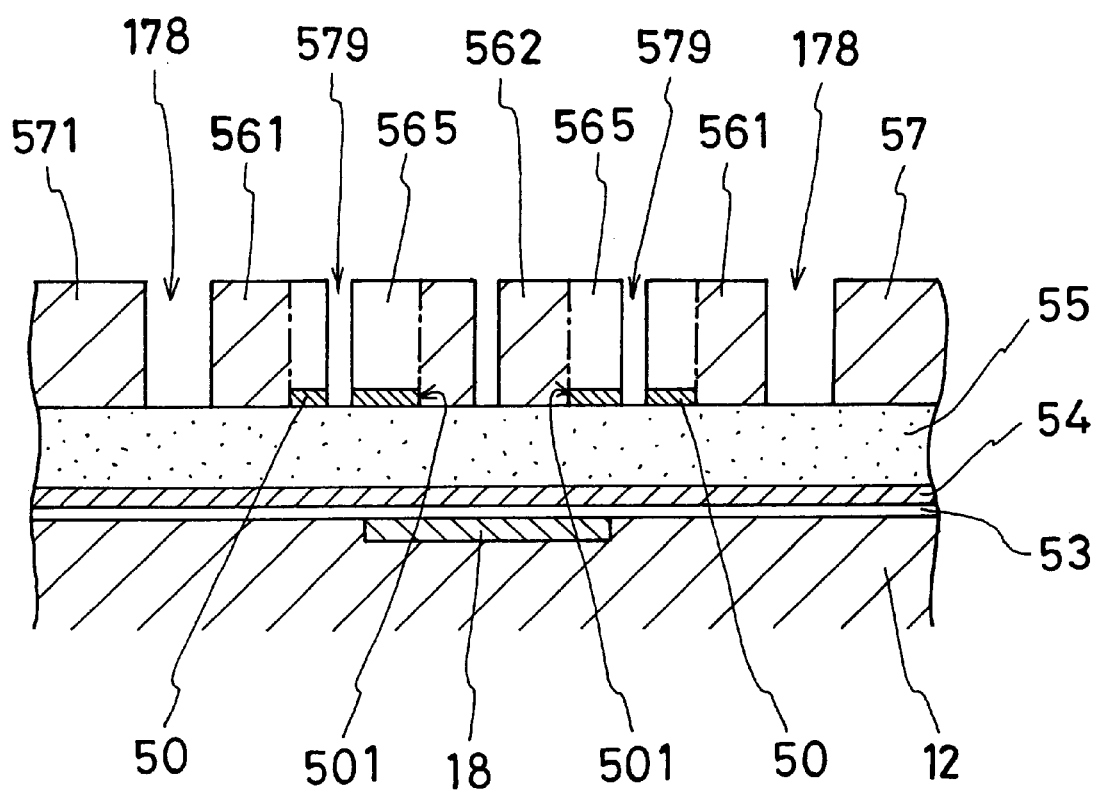
FIG. 9 illustrates a second manufacturing method of a semiconductor micromachine where a diffusion inhibiting layer is provided with dopant diffusion windows.

In this manufacturing method, as shown in FIG. 9, the diffusion inhibiting layer 50 is provided with dopant diffusion windows 501. The semiconductor thin film 57 is selectively doped by passing a dopant contained in the etching layer 55 through the dopant diffusion windows 501, so that the electrodes and the wires are formed.

This manufacturing method provides a semiconductor micromachine wherein the driving electrode sections, the detecting electrode section, the wires and the like of the movable portion are made of an n-type semiconductor, and wherein the electrical insulation section is made of a p-type semiconductor or an undoped semiconductor.

The aforementioned semiconductor micromachine is constructed substantially in the same manner as that of the first embodiment as illustrated in FIG. 1.

As is the case with the first manufacturing method as illustrated in FIGS. 5 through 8, this manufacturing method also employs the substrate 12 having on the surface thereof the distance detecting electrode 18 or the like. Subsequently, the silicon oxidation film 53 is provided on the substrate 12, and the etching stopper layer 54 is provided on the silicon oxidation film 53. Furthermore, PSG as the etching layer 55 is provided on the etching stopper layer 54, and the diffusion inhibiting layer 50 having the dopant diffusion windows 501 is provided on the etching layer 55.

As shown in FIG. 9, the dopant diffusion windows 501 are provided such that the overall shape and locations (as illustrated in FIG. 1) of the stationary-side driving electrode sections 171, the acicular bodies 15, the wires 159, the driving electrode sections 161, the detecting electrode section 162 and the like of the semiconductor micromachine 1 to be manufactured are obtained. The dopant diffusion windows 501 are hollow hole portions formed in the diffusion inhibiting layer 50 such that the etching layer 55 can face the later-described semiconductor thin film 57.

After the semiconductor thin film has been formed, the portions constituting the stationary-side driving electrode sections 171, the acicular bodies 15, the wires 159, the driving electrodes 161 and the detecting electrode section 162 may be doped with an n-type dopant by means of ion implantation. By doping the semiconductor thin film 57 from both sides thereof with the dopant in this manner, the doping process can be carried out reliably.

Instead of doping the semiconductor thin film 57 with the n-type dopant by means of ion implantation, the doping areas 561, 562 and 571 may be formed by selectively diffusing phosphorus or arsenic into the semiconductor thin film 57 in a vapor phase or a solid phase.

After the thermal treatment, the PSG film, the ASG film, the BSG film, the SiN film and the SiON film may be removed. Also, the semiconductor thin film 57 may be a $p^-$-type semiconductor. The $p^-$-type semiconductor is a p-type semiconductor containing a dopant dense enough to be changed into a n-type semiconductor by diffusing the dopant from the etching layer.

The substrate 12 or the like is then subjected to a thermal treatment. In this case, the phosphorus contained in the etching layer 55 is diffused from the dopant diffusion windows 501 into the semiconductor thin film 57.

The doping areas 561, 562 and 571 of n-type are thus formed in the semiconductor thin film 57. These areas constitute the stationary-side driving electrode sections 171, the acicular bodies 15, the wires 159, the driving electrode sections 161, and the detecting electrode sections 162 of the semiconductor micromachine 1.

By subsequently processing the semiconductor thin film 57, the portions constituting the movable portion 13, the driving electrode sections 161 provided adjacent to the movable portion 13, the acicular bodies 15, 150, the stationary portions 17, and the stationary-side driving electrode sections 171 are formed.

Thereafter, as in the first manufacturing method, an etching process or the like is carried out, and the semiconductor micromachine 1 is thus obtained.

In other details, this manufacturing method is substantially the same as the first manufacturing method.

According to this manufacturing method, the driving electrode sections 161, the detecting electrode section 162, the wires each made of an n-type semiconductor are interconnected by the electrical insulation section 160 made of a p-type semiconductor or an undoped semiconductor.

Namely, an npn-connection or an n-(undoped)-n-connection is formed in the movable portion 13. It is thus possible to ensure electrical insulation between the driving electrode sections 161 and the detecting electrode section 162 reliably.

In other respects, the operation and effect of this manufacturing method are substantially the same as those of the first manufacturing method.

In this manufacturing method, the stationary-side driving electrode sections 171, the acicular bodies 15, the wires 159, the driving electrode sections 161, and the detecting electrode section 162 and the like are formed by using the dopant diffusion windows 501. Conversely, however, the electrical insulation section 160 may be formed by using the dopant diffusion windows.

In the aforementioned manufacturing method, the diffusion inhibiting layer is utilized to form the conductive portions such as the electrode sections or the wires separately from the electrical insulation section. However, the diffusion inhibiting layer is not absolutely indispensable for separating these portions from each other. Hereinafter, this manufacturing method will be described schematically with reference to FIGS. 10 to 13.

First, the etching layer 55 made of a Ge film is formed on the substrate 12. The semiconductor thin film 57 made of Si (Si film) is then formed on the etching layer 55. Then, the semiconductor thin film 57 is selectively doped with a dopant. In this case, the semiconductor thin film 57 may be subjected to a thermal treatment in order to reduce inner stresses.

Subsequently, the semiconductor thin film 57 is patterned in a photolithographic etching process, so that at least the introduction holes 579 for introducing an etching agent, the movable portion 13 having a plurality of electrodes (namely, the driving electrode sections 161 and the detecting electrode section 162) or the wires 159 and the electrical insulation section 160, and the acicular bodies 15, 150 supporting the movable portion 13 are formed. By subsequently removing the etching layer 55, the gap portion 11 is formed, and the semiconductor thin film 57 is formed as the movable portion 13.

In this manufacturing method, the etching layer 55 is made of a mixed crystal thin film. Preferably, the etching layer 55 contains a higher percentage of Ge than the semiconductor thin film. It is generally known as the percentage of Ge is increased, the higher the etching rate becomes. It is thus possible to subject an etching layer to an etching process by priority by enhancing the percentage of Ge contained therein.

In order to remove the etching layer, it is desirable to use at least one sort of etching agent selected from oxygenated water, a mixture of oxygenated water and sulfuric acid, and a mixture of oxygenated water and hydrofluoric acid. Oxygenated water and the mixture of oxygenated water and sulfuric acid are far from toxic, and therefore easy to handle. In the case where oxygenated water or the mixture of oxygenated water and sulfuric acid is used as the etching agent, a Ge thin film is suitable for the etching layer 55. In the case where the mixture of oxygenated water and hydrofluoric acid is used, both a Si—Ge mixed crystal thin film and the Ge thin film can be used as the etching layer 55.

The etching layer 55 may be removed by subjecting it to a thermal treatment in the oxygen atmosphere. Accordingly, in the case where the etching layer 55 is made of a Ge thin film, the etching process can be carried out in a vapor phase. The vapor phase etching allows the etching layer 55 to be removed without causing damage thereto. In this case, the aforementioned etching process is most preferably carried out in a low pressure atmosphere. This accelerates desorption of a compound of Ge with oxygen ($GeO_x$).

The etching layer 55 may be an undoped Ge thin film or a Si—Ge mixed crystal thin film. In this case, it is possible to prevent a dopant from the etching layer 55 entering into the semiconductor thin film 57 reliably.

The etching layer 55 may also be an n-type Ge thin film 57 or an n-type Si—Ge mixed crystal thin film 57 including at least one n-type dopant selected from P, As and Sb. In this case, it is possible to enhance the etching rate of the etching layer 55 and reduce the etching time.

Furthermore, the density of the n-type dopant in the etching layer 55 is preferably equal to or lower than $10_{20}$ $cm^{-3}$. If the density of the dopant is higher than this value, the amount of the n-type dopant diffused into the semiconductor thin film 57 increases, so that the conductivity of the semiconductor thin film increases correspondingly. Therefore, the electrical insulation section 160 interconnecting the electrode sections 161,162 may no longer perform an insulating function, so that the movement of electric charges between the respective electrode sections 161,162 via the electrical insulation section 160 (crosstalk of electric signals) may be induced.

In the case where the etching layer 55 is made of n-type Ge or Si—Ge, it is possible to inhibit the dopant in the etching layer from being diffused by employing n-type electrodes of the movable portion and p-type wires.

In addition, the etching layer 55 may also be a p-type Ge thin film or S—Ge mixed crystal thin film including at least one sort of p-type dopant selected from B, Ga and In. In the case where electrode sections of an n-type semiconductor interconnected by an undoped electrical insulation section 160 are provided preliminarily on the semiconductor thin film 57, the p-type dopant in the etching layer 55 is diffused into the electrical insulation section 160. Consequently, the electrical insulation section 160 acquires, although to a limited extent, the characteristics of p-type. In this manner, there is formed in the movable portion an npn-connection, which ensures electrical insulation among the electrode sections more reliably.

In this case, the density of the p-type dopant is preferably equal to or lower than $10^{20}$ $cm^{-3}$. If the density of the dopant is lower than this value, the etching rate of the etching layer 55 does not drop substantially. It is thus possible to reduce the etching time.

The etching layer 55 is preferably made of a Si—Ge mixed crystal thin film containing 20 or more atm (atomic) % of Ge. In this case, the semiconductor thin film 57 constituting the movable portion 13 preferably contains 80 or less atm % of Ge. It is thus possible to carry out the etching process reliably using oxygenated water and hydrofluoric acid. In the case where the etching layer 55 contains less than 20 atm % of Ge and where the semiconductor thin film 57 contains more than 80 atm % of Ge, the etching selective ratio of the etching layer 55 to the semiconductor thin film 57 constituting the movable portion decreases. Therefore, it is likely that the semiconductor thin film 57 constituting the movable portion 13 is subjected to the etching process.

The substrate is preferably provided with selective growth masks made of a Si oxidation film or a Si nitridation film for selectively forming the etching layer 55. It is thus possible to selectively form the etching layer 55 only at desired locations. After the selective growth of the etching layer 55, the selective growth masks may be removed or left as they are. In the latter case, the semiconductor thin film 57 can be provided on the selective growth masks.

A concrete manufacturing method of such a semiconductor micromachine will now be described.

Third Manufacturing Method

As shown in FIGS. 10(a), 12(a), the distance detecting electrode 18 or the like is provided on the substrate 12 made of p-type monocrystal silicon, and is manufactured by using a resist pattern formed by a photolithographic process and doping a predetermined portion of the substrate 21 with phosphorus as an n-type dopant by means of ion implantation.

Thus fabricated substrate 12 is then heated/oxidated, and provided with the silicon oxidation film 53 having a thickness of 1000 Å to protect the distance detecting electrode 18 or the like.

Figure 10:
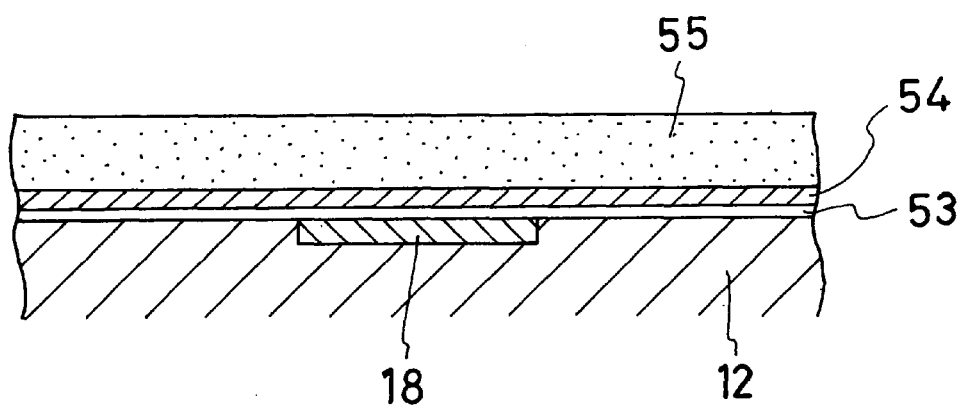
FIGS. 10a, 10b and 10c illustrate cross-sectional views taken along line A—A in FIG. 1 and show process steps of the third manufacturing method.
Figure 10:
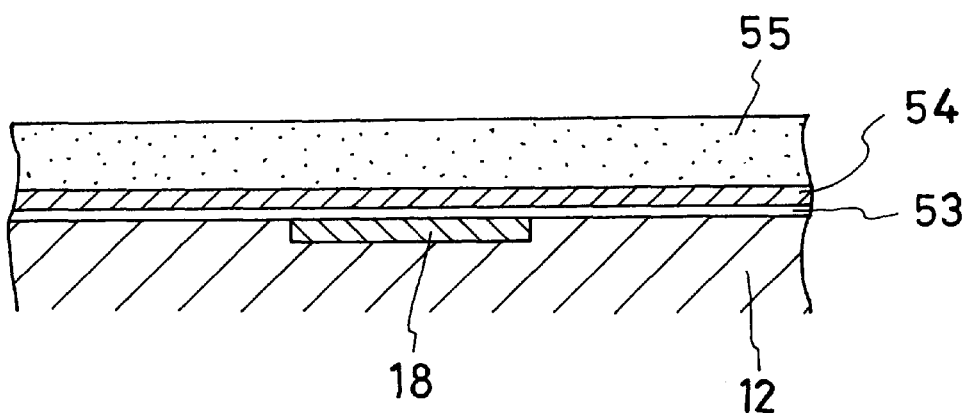
Figure 10:
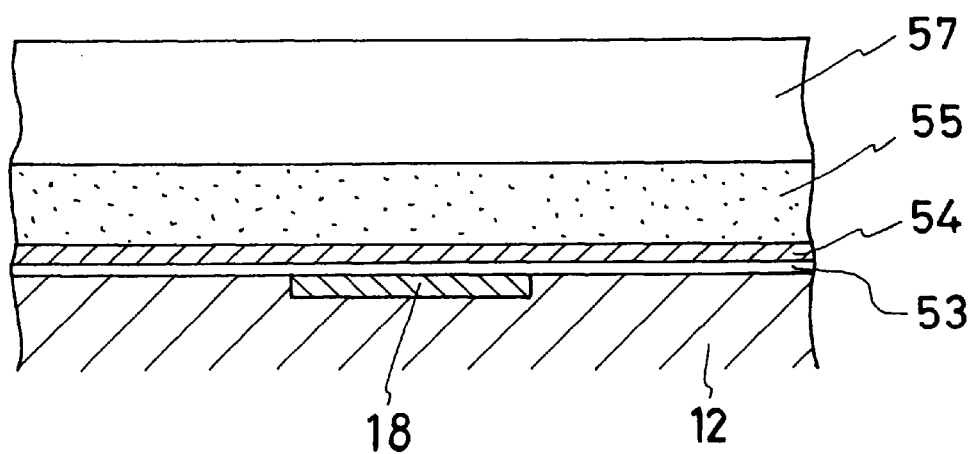

As shown in FIGS. 10(*a*), 12(*a*), the etching stopper layer 54 is provided on the silicon oxidation film 53 formed on the substrate 12 by a P-CVD (plasma chemical vapor deposition) method using $SiH_4$ and $NH_3$ as a source gas. The etching stopper layer 54 is made of a silicon nitridation film having a thickness of 3000 Å. The etching stopper layer 54 and the $SiO_2$ film 53 are not absolutely indispensable.

Subsequently, the etching layer 55 is formed on the etching stopper layer 54 by the P-CVD method using $GeH_4$ as a source gas. The etching layer 55 is made of a Ge thin film having a thickness of 2 μm.

In the case where the etching stopper layer 54 and the $SiO_2$ film 53 are not provided, it is desirable to form an undoped Ge thin film by a normal CVD method.

As shown in FIGS. 10(*b*), 12(*b*), the silicon oxidation film 53, the etching stopper layer 54, the contact holes 500 penetrating the etching layer 55 are formed by the etching process, using a resist pattern formed by a photolithographic process as a mask.

As shown in FIGS. 10(*c*), 12(*c*), the semiconductor thin film 57 is provided on the etching layer 55 by a LP-CVD method where $SiH_4$ is used as a source gas. The semiconductor thin film 57 is made of a polycrystal Si thin film having a thickness of 2 μm. The semiconductor thin film 57 constitutes the movable portion 13, the acicular bodies 15, 150 and the like of the semiconductor micromachine 1 manufactured according to this manufacturing method.

In this case, the contact holes 500 are also filled with leg portions 559 integrated with the semiconductor thin film 57. The leg portions 559 serve to support the acicular bodies 15, 150 of the semiconductor micromachine 1.

Subsequently, the semiconductor thin film 57 is doped with phosphorus as a dopant by means of ion implantation, using a resist pattern formed by a photolithographic process as a mask. This doping process makes it possible to provide the semiconductor thin film 57 with the doping areas 561, 562 and 571 that serve as the detecting electrode section 162, the driving electrode sections 161, and the stationary-side driving electrode sections 171 of the semiconductor micromachine 1, respectively. In this case, the portions constituting the acicular bodies 15 and the wires 159 are manufactured in a similar manner.

The doping areas 561, 562 are interconnected by an undoped area 560 that is left undoped. This undoped area 560 serves as the electrical insulation section 160 of the finished semiconductor micromachine 1.

The substrate 12 is then subjected to a thermal treatment in a nitrogen atmosphere at 1000° C. for 30 minutes in an annealing furnace. This thermal treatment reduces internal stresses generated in the semiconductor thin film 57 during the aforementioned processes and activates the dopant contained therein.

Figure 11:
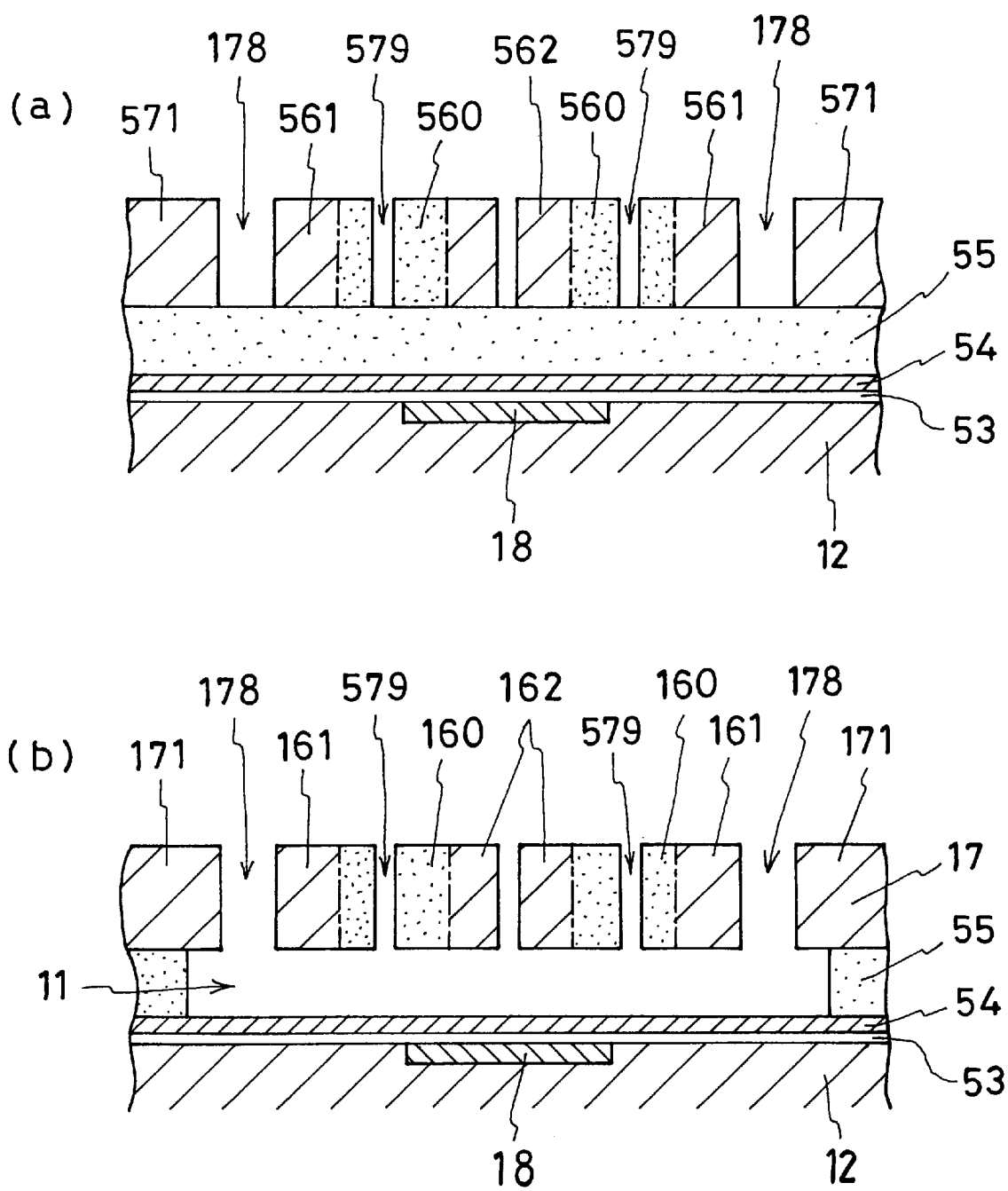
FIGS. 11(a) and 11(b) illustrate a subsequent step of manufacturing the semiconductor micromachine according to the third manufacturing method as illustrated in FIG. 11.
Figure 12:
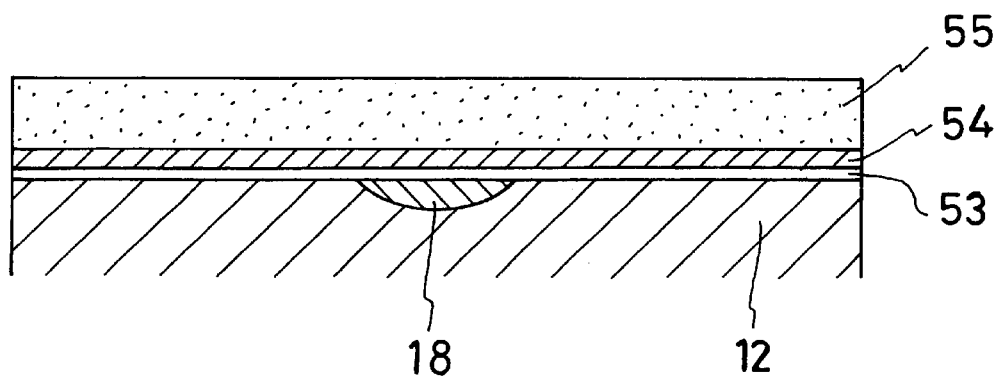
FIGS. 12a, 12b, and 12c illustrate cross-sectional views taken along line B—B in FIG. 1 and show process steps of the third manufacturing method.
Figure 12:
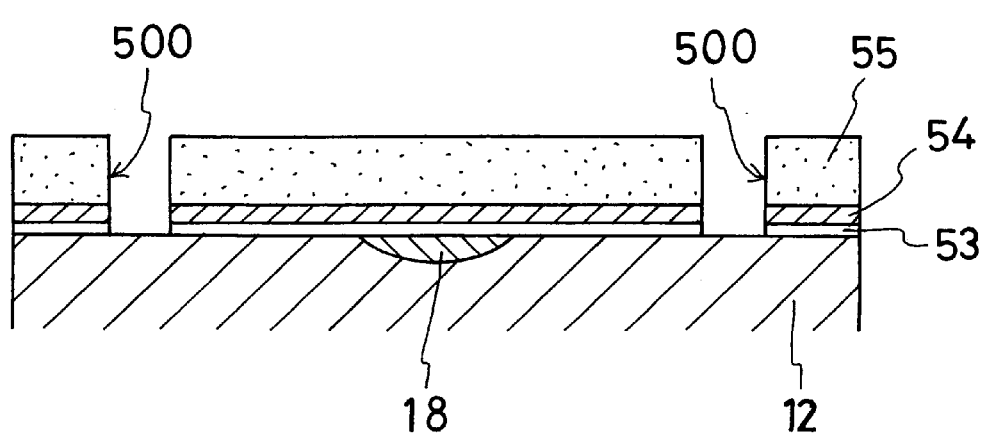
Figure 12:
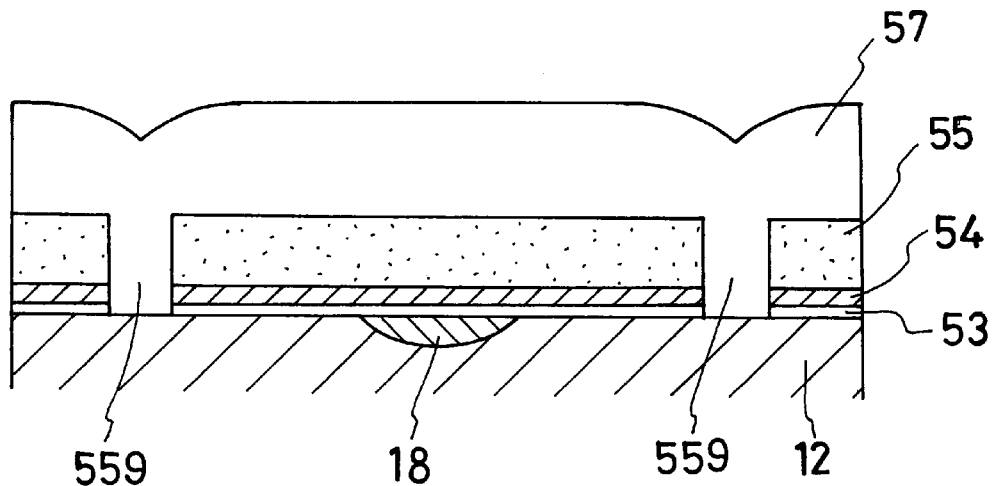
Figure 13:
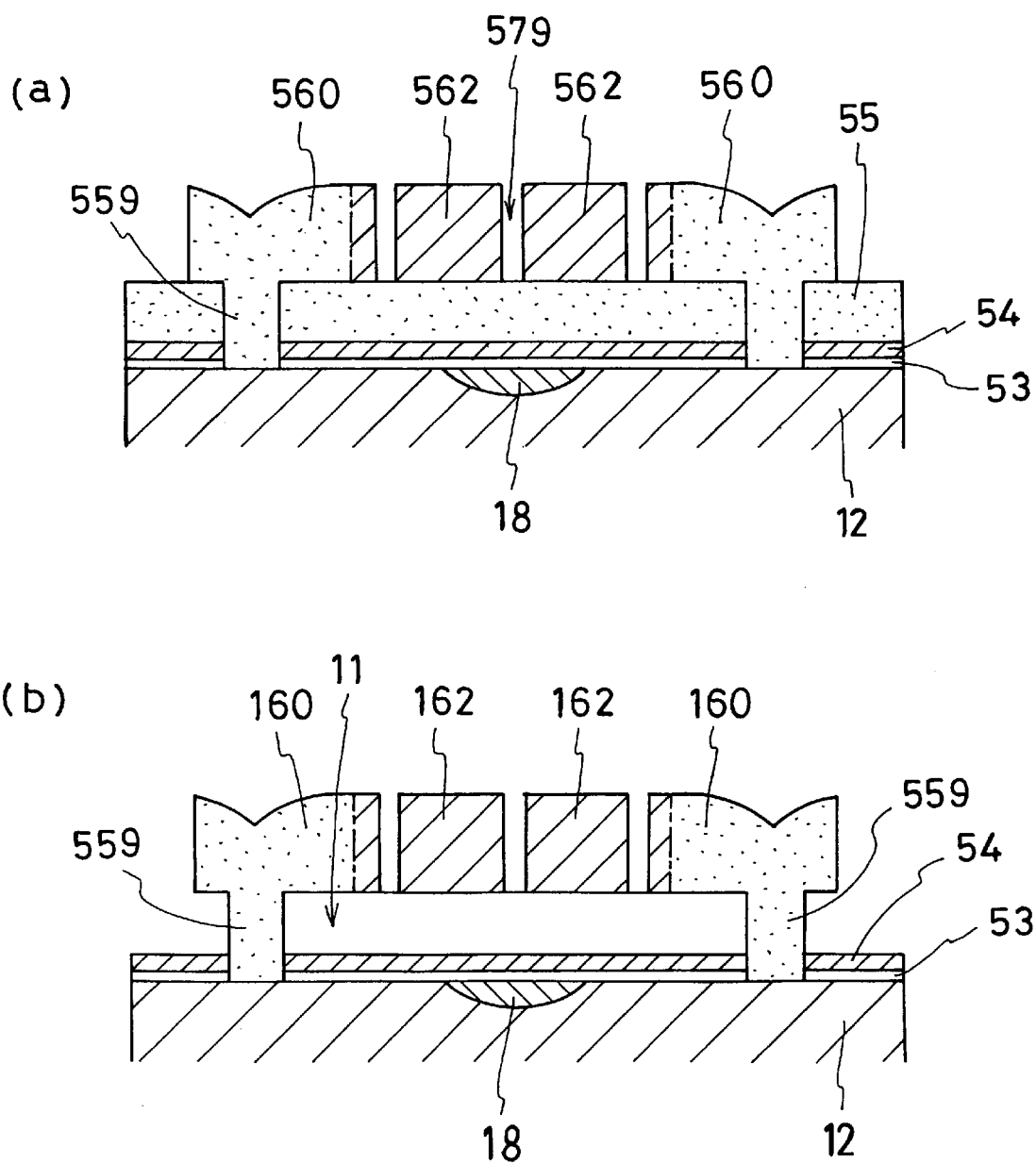
FIGS. 13(a) and 13(b) illustrate a subsequent step of manufacturing the semiconductor micromachine according to the third manufacturing method as illustrated in FIG. 12.

As shown in FIGS. 11(*a*), 13(*a*), the semiconductor thin film 57 is subjected to a photolithographic etching process to form a resist pattern, which is used as a mask in an anisotropic etching process by means of RIE. In this manner, the portions constituting the movable portion 13, the driving electrode sections 161 provided adjacent to the movable portion 13, the acicular bodies 15, 150, the stationary portions 17, and the stationary-side driving electrode sections 171 are formed.

The movable portion 13 is provided with many introduction holes 579 for introducing a later-described etchant thereinto, the introduction holes 579 having a square cross section whose side length is about 4 μm.

Subsequently, the etching layer 55 is subjected to an etching process. In this etching process, oxygenated water is used as an etchant.

In the aforementioned etching process, the etchant passes through the areas deprived of the semiconductor thin film 57 by the etching process, reaches the etching layer 55 beneath the semiconductor thin film 57, and erodes the etching layer 55.

In this manner, as shown in FIGS. 11(*b*), 13(*b*), the gap 11 is formed between the semiconductor thin film 57 and the substrate 12.

Thereafter follow the steps of pure water cleaning, alcohol (IPA)-substitution, and desiccation, so that the semiconductor micromachine 1 is obtained.

The operation and effect of this manufacturing method will now be described.

In this manufacturing method, the etching layer 55 is made of a Ge thin film. The etching layer 55 thus contains few materials that act as a dopant for the semiconductor thin film 57. Hence, there is no possibility of a dopant being diffused from the etching layer 55 into the semiconductor thin film 57. It is thus possible to prevent an excessive amount of dopant from entering the electrical insulation section 160 that interconnects the driving electrode sections 161, the detecting electrode section 162, and the wires 159 of the movable portion 13 and to keep the conductivity of the electrical insulation section 160 low. As a result, a high-performance semiconductor micromachine 1 which ensures electrical insulation among the electrodes and the wires can be obtained.

Although the wires connecting the aforementioned electrode pads with the respective electrodes are formed by means of ion implantation into the substrate, it is also possible to employ an n-type area, a metallic thin film 57 or the like. The metallic thin film is used for the wires or electrode pads that have been changed into the n-type by means of ion implantation into the semiconductor thin film 57.

Hence, it is possible to provide a manufacturing method of the semiconductor micromachine 1 whose respective electrodes and wires of the movable portion 13 are securely separated from each other by the electrical insulation section 160.

Alternatively, the semiconductor micromachine of the present invention can be manufactured as follows.

Fourth Manufacturing Method

According to the fourth manufacturing method of the semiconductor micromachine, the substrate is provided with a selective growth masks made of a Si oxidation film for selectively forming the etching layer.

Figure 14:
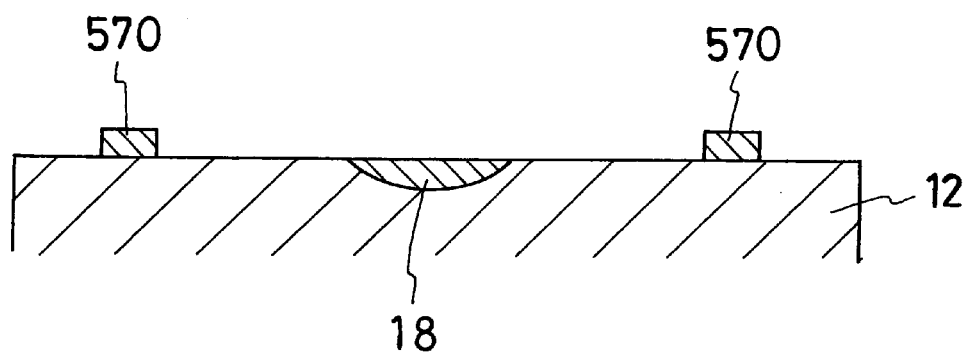
FIGS. 14(a), 14(b) and 14(c) illustrate a fourth manufacturing method of a semiconductor micromachine.
Figure 14:
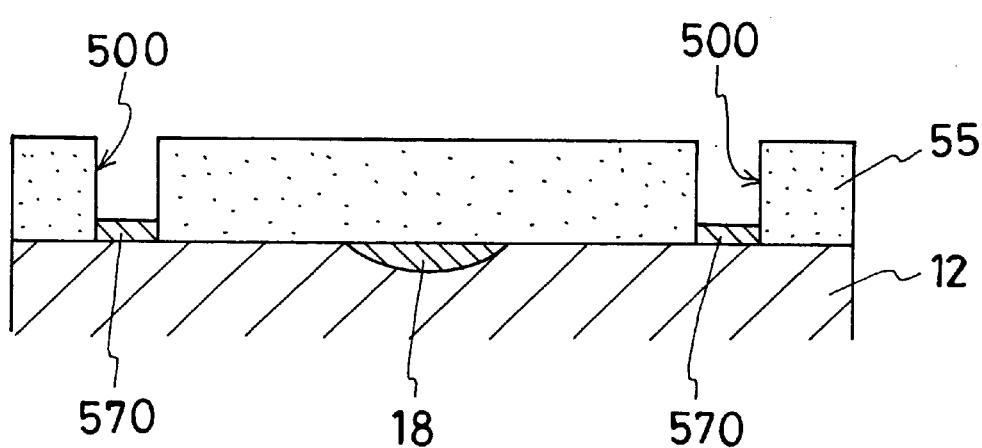
Figure 14:
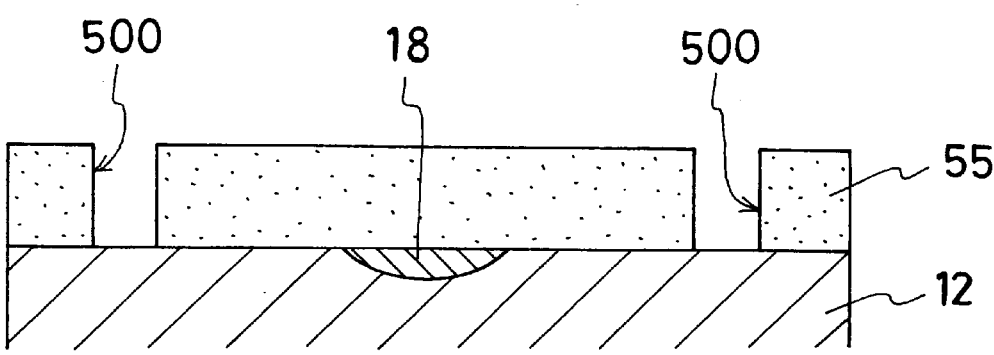

First, the substrate 12 is provided with the distance detecting electrode 18 or the like substantially in the same manner as in the third manufacturing method. As shown in FIG. 14(*a*), a $SiO_2$ thin film is then formed on the substrate 12 in a thermal treatment in an oxygen atmosphere, a resist pattern is formed as a mask in a photolithographic etching process, and the $SiO_2$ thin film is subjected to an etching process by means of RIE. In this manner, selective growth masks 570 are formed.

Subsequently, as shown in FIG. 14(*b*), the etching layer 55 is provided by the LP-CVD method where $GeH_4$ is used as a source material. In this case, the etching layer 55 is not formed on the portions provided with the selective growth masks 570. Therefore, these portions become the contact holes 500.

The formation of the etching layer 55 utilizes selective growth by means of thermal decomposition of $GeH_4$. In this case, a thermal decomposition reaction of $GeH_4$ is promoted by employing a gas source molecular beam epitaxial system (GS-MBE), an atmospheric pressure CVD system or the like.

As shown in FIG. 14(c), the selective growth masks 570 remaining within the contact holes 500 are then removed by an etching step using hydrofluoric acid.

Subsequently, the semiconductor thin film is formed on the etching layer 55 and subjected to the selective doping step and the thermal treatment. The introduction holes for introducing an etchant, the movable portion and the acicular bodies are then formed on the semiconductor thin film.

Thereafter, the etching layer is removed, so that the semiconductor thin film together with the gap portion 13 constitutes the movable portion. In this manner, the semiconductor micromachine 1 is obtained.

In other respects, this manufacturing method is substantially the same as the third manufacturing method.

This manufacturing method allows formation of the contact holes by means of selective growth, so that an etching layer provided with contact holes having a high aspect ratio can be obtained. In other respects, this manufacturing method is substantially the same as the third manufacturing method.

While the present invention has been described with reference to what are presently considered to be preferred embodiments thereof, it is to be understood that the present invention is not limited to the disclosed embodiments or manufacturing methods. To the contrary, the present invention is intended to cover various modifications and equivalent arrangements included within the spirit and scope of the appended claims.

What is claimed as new and desired to be secured by Letters Patent of the United States is:

1. A manufacturing method of a semiconductor micromachine having a substrate, a movable portion arranged opposite said substrate with a gap interposed therebetween, said movable portion comprising a semiconductor having a plurality of electrode sections and an electrical insulation section interconnecting the electrode sections, and supporting bodies which floatably support said movable portion, comprising the steps of:

forming an etching layer on said substrate;

forming a diffusion inhibiting layer on said etching layer;

forming a semiconductor layer on said diffusion inhibiting layer;

selectively doping said semiconductor layer with a dopant;

patterning said semiconductor layer by photolithographic etching to form holes for introducing an etchant, said plurality of electrode sections, said electrical insulation section, and said supporting bodies; and forming said gap and said semiconductor layer as the movable portion by removing said etching layer using said etchant.

2. The manufacturing method of the semiconductor micromachine according to claim 1, wherein said diffusion inhibiting layer is patterned.

3. The manufacturing method of the semiconductor micromachine according to claim 1, wherein said diffusion inhibiting layer is provided with dopant diffusion windows through which the dopant is diffused into said semiconductor layer.

4. The manufacturing method of the semiconductor micromachine according to claim 1, wherein said diffusion inhibiting layer is selected from a silicon nitridation film, a silicon nitridation oxidation film and a boron glass film.

5. The manufacturing method of the semiconductor micromachine according to claim 1, wherein said etching layer is a phosphorous glass film or an arsenic glass film.

6. The manufacturing method of the semiconductor micromachine according to claim 1, wherein said substrate is selected from a monocrystal silicon substrate, a polycrystal silicon substrate, a quartz glass substrate, a monocrystal sapphire substrate and a stainless steel substrate.

7. A manufacturing method of a semiconductor micromachine having a substrate, a movable portion arranged opposite said substrate with a gap interposed therebetween, said movable portion comprising a semiconductor and having a plurality of electrode sections and an electrical insulation section interconnecting the electrode sections, and supporting bodies which floatably support said movable portion, comprising the steps of:

forming an etching layer comprising one of a Ge thin film and a Si—Ge mixed crystal thin film on said substrate;

forming a semiconductor layer comprising at least one element of the fourth group of elements in the periodic table on said etching layer;

selectively doping said semiconductor layer with a dopant;

patterning said semiconductor layer by photolithographic etching to form holes for introducing an etchant, said plurality of electrode sections, said electrical insulation section, and said supporting bodies; and forming said gap and said semiconductor layer as the movable portion by removing said etching layer using said etchant.

8. The manufacturing method of the semiconductor micromachine according to claim 7, wherein said etching layer is made of a Si—Ge mixed crystal thin film, and wherein said etching layer contains a higher percentage of Ge than said semiconductor thin film.

9. The manufacturing method of the semiconductor micromachine according to claim 7, wherein the etchant used to remove said etching layer is made of at least one material selected from oxygenated water, mixture of oxygenated water and sulfuric acid, and mixture of oxygenated water and hydrofluoric acid.

10. The manufacturing method of the semiconductor micromachine according to claim 7, wherein said etching layer is removed by means of a thermal treatment in oxygen atmosphere.

11. The manufacturing method of the semiconductor micromachine according to claim 7, wherein said etching layer is an undoped Ge thin film or a Si—Ge mixed crystal thin film.

12. The manufacturing method of the semiconductor micromachine according to claim 7, wherein said etching layer is an n-type Ge thin film or an n-type Si—Ge mixed crystal thin film, and wherein said etching layer contains an n-type dopant that is at least one material selected from phosphorus (P), arsenic (As) and antimony (Sb).

13. The manufacturing method of the semiconductor micromachine according to claim 12, wherein the n-type dopant in said etching layer has a density equal to or lower than $10^{20}$ cm$^{-3}$.

14. The manufacturing method of the semiconductor micromachine according to claim 7, wherein said etching layer is a p-type Ge thin film or a p-type Si—Ge mixed crystal thin film, and wherein said etching layer contains a p-type dopant that is at least one material selected from boron (B), gallium (Ga) and indium (In).

15. The manufacturing method of the semiconductor micromachine according to claim 14, wherein the p-type dopant in said etching layer has a density equal to or lower than $10^{20}$ cm$^{-3}$.

16. The manufacturing method of the semiconductor micromachine according to claim 7, wherein said etching layer is made of a Si—Ge mixed crystal thin film, and wherein said Si—Ge mixed crystal thin film contains 20 or more atm (atomic) % of Ge.

17. The manufacturing method of the semiconductor micromachine according to claim 7, wherein said etching layer is made of a Si—Ge mixed crystal thin film, and wherein the semiconductor thin film constituting the movable portion contains 80 or less atm (atomic) % of Ge.

18. The manufacturing method of the semiconducor micromachine according to claim 7, wherein said substrate is provided with a selective growth mask for selectively forming the etching layer, and wherein said selective growth mask is made of a Si oxidation film or a Si nitridation film.

* * * * *